United States Patent
Kadous et al.

(10) Patent No.: US 7,184,713 B2
(45) Date of Patent: *Feb. 27, 2007

(54) RATE CONTROL FOR MULTI-CHANNEL COMMUNICATION SYSTEMS

(75) Inventors: Tamer Kadous, San Diego, CA (US); Ivan Jesus Fernandez-Corbaton, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 678 days.

This patent is subject to a terminal disclaimer.

(21) Appl. No.: 10/176,567

(22) Filed: Jun. 20, 2002

(65) Prior Publication Data

US 2003/0236080 A1 Dec. 25, 2003

(51) Int. Cl.
*H04B 17/00* (2006.01)

(52) U.S. Cl. .............................. 455/67.13; 455/452.2; 455/59; 455/115.1; 455/226.3; 370/252; 375/346

(58) Field of Classification Search ......... 455/423–425, 455/450–453, 67.11–67.16, 59–60, 114.2–115.4, 455/226.1–226.4, 296, 299, 522, 69, 101–105; 370/250–252, 253; 375/346–351
See application file for complete search history.

(56) References Cited

U.S. PATENT DOCUMENTS

| | | | | |
|---|---|---|---|---|
| 5,596,570 A | * | 1/1997 | Soliman | 370/252 |
| 5,675,581 A | * | 10/1997 | Soliman | 370/252 |
| 5,862,453 A | * | 1/1999 | Love et al. | 455/69 |
| 6,097,771 A | | 8/2000 | Foschini | |
| 6,298,242 B1 | * | 10/2001 | Schiff | 455/522 |
| 6,473,467 B1 | | 10/2002 | Wallace et al. | |
| 6,690,747 B2 | * | 2/2004 | Petrus et al. | 375/324 |
| 6,744,813 B1 | | 6/2004 | Ko et al. | |
| 2002/0085641 A1 | | 7/2002 | Baum | |
| 2002/0142723 A1 | | 10/2002 | Foschini et al. | |
| 2003/0095508 A1 | * | 5/2003 | Kadous et al. | 370/252 |
| 2004/0062193 A1 | | 4/2004 | Ma et al. | |

* cited by examiner

*Primary Examiner*—Charles Craver
(74) *Attorney, Agent, or Firm*—Dmitry R. Milikovsky; Micky Minhas; Philip Wadsworth

(57) ABSTRACT

Techniques to determine a set of rates for a set of data streams to be transmitted in a multi-channel communication system. A group of transmission channels to be used for each data stream is initially identified. An equivalent system for each group is then defined to have an AWGN (or flat) channel and a spectral efficiency equal to the average spectral efficiency of the transmission channels in the group. A metric for each group is then derived based on the associated equivalent system, e.g., set to the SNR needed by the equivalent system to support the average spectral efficiency. A rate for each data stream is then determined based on the metric associated with the data stream. The rate is deemed to be supported by the communication system if the SNR required to support the data rate by the communication system is less than or equal to the metric.

44 Claims, 13 Drawing Sheets

RATE CONTROL FOR MULTI-CHANNEL COMMUNICATION SYSTEMS

BACKGROUND

1. Field

The present invention relates generally to data communication, and more specifically to techniques for controlling the rate of data transmission for multi-channel communication systems.

2. Background

An orthogonal frequency division multiplex (OFDM) communication system effectively partitions the overall system bandwidth into multiple ($N_F$) sub-bands, which may also be referred to as frequency subchannels or frequency bins. Each frequency subchannel is associated with a respective subcarrier (or tone) upon which data may be modulated. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subchannel, a modulation symbol may be transmitted on each of the $N_F$ frequency subchannels. OFDM may be used to combat inter-symbol interference (ISI) caused by frequency selective fading, which is characterized by different amounts of attenuation across the system bandwidth.

A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel of the MIMO channel and corresponds to a dimension. The MIMO system can provide improved performance (e.g., increased transmission capacity) if the additional dimensionalities created by the multiple transmit and receive antennas are utilized.

For a MIMO system that employs OFDM (i.e., a MIMO-OFDM system), $N_F$ frequency subchannels are available on each of the $N_S$ spatial subchannels for data transmission. Each frequency subchannel of each spatial subchannel may be referred to as a transmission channel. $N_F \cdot N_S$ transmission channels are thus available for data transmission between the $N_T$ transmit antennas and $N_R$ receive antennas.

For a MIMO-OFDM system, the $N_F$ frequency subchannels of each spatial subchannel may experience different channel conditions (e.g., different fading and multipath effects) and may achieve different signal-to-noise-and-interference ratios (SNRs). Each transmitted modulation symbol is affected by the response of the transmission channel via which the symbol was transmitted. Depending on the multipath profile of the communication channel between the transmitter and receiver, the frequency response may vary widely throughout the system bandwidth for each spatial subchannel, and may further vary widely among the spatial subchannels.

For a multipath channel with a frequency response that is not flat, the information rate (i.e., the number of information bits per modulation symbol) that may be reliably transmitted on each transmission channel may be different from transmission channel to transmission channel. If the modulation symbols for a particular data packet are transmitted over multiple transmission channels, and if the response of these transmission channels varies widely, then these modulation symbols may be received with a wide range of SNRs. The SNR would then vary correspondingly across the entire received packet, which may then make it difficult to determine the proper rate for the data packet.

Since different receivers may experience different (and possibly widely varying) channel conditions, it would be impractical to transmit data at the same transmit power and/or data rate to all receivers. Fixing these transmission parameters would likely result in a waste of transmit power, the use of sub-optimal data rates for some receivers, and unreliable communication for some other receivers, all of which leads to an undesirable decrease in system capacity. Moreover, the channel conditions may vary over time. As a result, the supported data rates for the transmission channels would also vary over time. The different transmission capabilities of the communication channels for different receivers plus the multipath and time-variant nature of these communication channels make it challenging to efficiently transmit data in a MIMO-OFDM system.

There is therefore a need in the art for techniques to control the rate of data transmission in multi-channel communication systems such as MIMO-OFDM systems.

SUMMARY

Techniques are provided herein to control the rate of data transmission in a multi-channel communication system having multiple transmission channels. In an aspect, the rate of each data stream is determined based on a metric associated with the data stream. This metric may be derived based on an equivalent system that models the group of transmission channels to be used for the data stream. The equivalent system is defined to have an AWGN channel (i.e., a flat frequency response) and a spectral efficiency $S_{equiv}$ that is equal to the average spectral efficiency $S_{avg}$ of the group of transmission channels (i.e., the equivalent system has a total capacity equal to the total capacity of the group of transmission channels).

A specific embodiment provides a method for determining a set of rates for a set of data streams to be transmitted over a wireless communication channel in a multi-channel communication system (e.g., a MIMO-OFDM system). In the method, a group of transmission channels to be used for each data stream is initially identified.

An equivalent system for each transmission channel group is then defined based on one or more estimated channel characteristics of the transmission channels in the group. In an embodiment, the equivalent system for each transmission channel group may be defined by (1) obtaining an estimate of the SNR of each transmission channel, (2) estimating the spectral efficiency of each transmission channel based on the estimated SNR and a spectral efficiency function, $f(x)$, and (3) determining the average spectral efficiency of the transmission channels in the group based on the estimated spectral efficiencies of the individual transmission channels. The equivalent system is defined to have an AWGN channel and a spectral efficiency equal to the average spectral efficiency of the group of transmission channels.

A metric for each transmission channel group is then derived based on the associated equivalent system. In an embodiment, the metric is set to the SNR needed by the equivalent system to support the average spectral efficiency. This SNR is referred to as the equivalent SNR and may be determined based on an inverse function $f^{-1}(x)$.

A rate for each data stream is then determined based on the metric associated with the data stream. This may be achieved by evaluating one or more available rates. For each evaluated rate, the SNR required to support the data rate by the communication system is determined, and this rate is deemed to be supported by the communication system if the required SNR is less than or equal to the metric.

Various aspects and embodiments of the invention are described in further detail below. The invention further provides methods, receiver units, transmitter units, receiver systems, transmitter systems, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

An orthogonal frequency division multiplex (OFDM) communication system effectively partitions the overall system bandwidth into multiple ($N_F$) sub-bands, which may also be referred to as frequency subchannels or frequency bins. Each frequency subchannel is associated with a respective subcarrier (or tone) upon which data may be modulated.

A multiple-input multiple-output (MIMO) communication system employs multiple ($N_T$) transmit antennas and multiple ($N_R$) receive antennas for data transmission, and is denoted as an ($N_T$, $N_R$) system. A MIMO channel formed by the $N_T$ transmit and $N_R$ receive antennas may be decomposed into $N_S$ independent channels, with $N_S \leq \min \{N_T, N_R\}$. Each of the $N_S$ independent channels may also be referred to as a spatial subchannel of the MIMO channel. The number of spatial subchannels is determined by the number of eigenmodes for the MIMO channel, which in turn is dependent on a channel response matrix, $\underline{H}(k)$, that describes the response between the $N_T$ transmit and $N_R$ receive antennas. For simplicity, in the following description, the channel response matrix, $\underline{H}(k)$, is assumed to be full rank and the number of spatial subchannels is given as $N_S = N_T \leq N_R$.

The rate control techniques described herein may be used for various multi-channel communication systems having multiple transmission channels that may be used for data transmission. Such multi-channel systems include MIMO systems, OFDM systems, MIMO-OFDM systems, and so on. The transmission channels may be (1) spatial subchannels in MIMO systems, (2) frequency subchannels in OFDM systems, or (3) frequency subchannels of spatial subchannels in MIMO-OFDM systems.

Figure 1A:
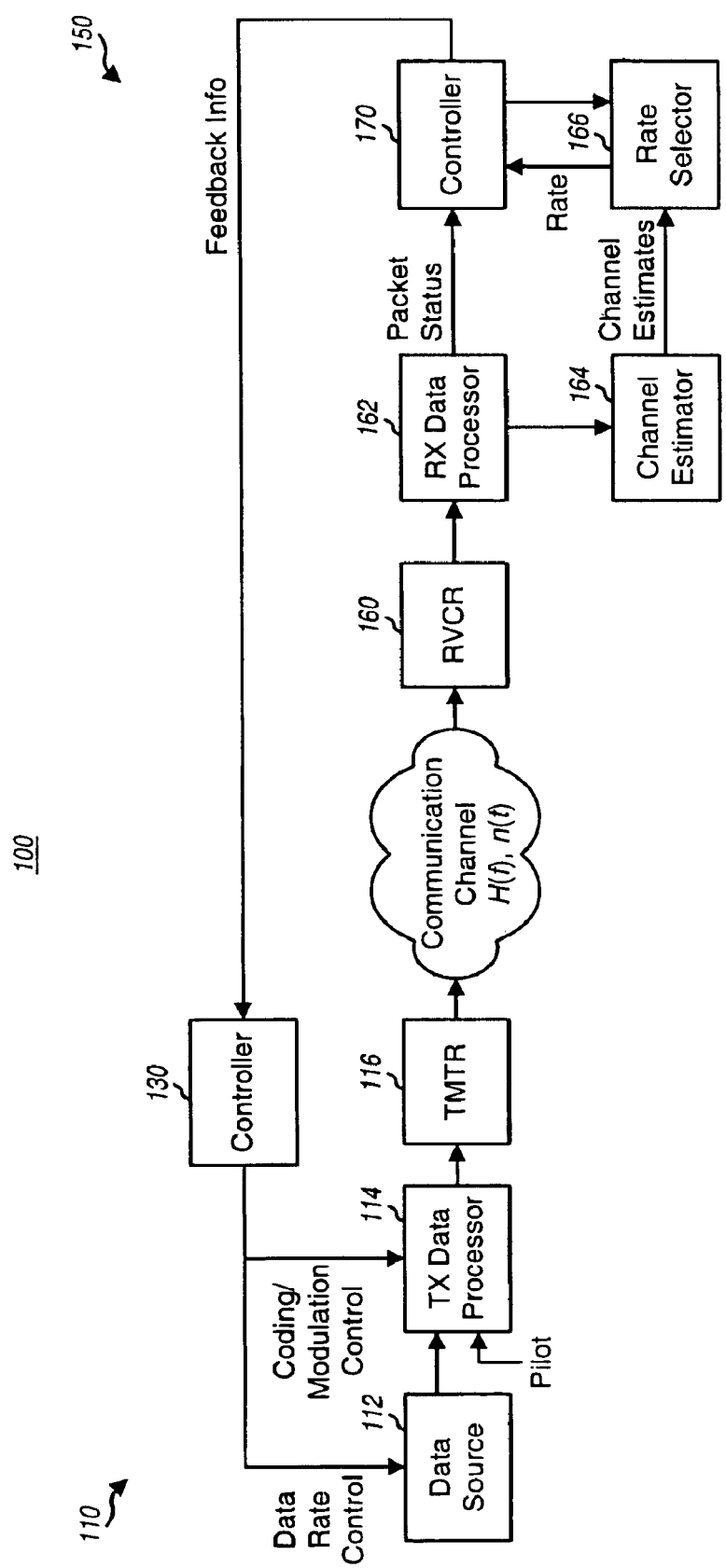
FIG. 1A is a diagram of a model of a multi-channel communication system.

FIG. 1A is a diagram of a model of a multi-channel communication system 100. At a transmitter 110, traffic data is provided from a data source 112 to a transmit (TX) data processor 114. TX data processor 114 may demultiplex the traffic data into $N_D$ data streams, $N_D$ is any integer one or greater. Each data stream may be independently processed and then transmitted over a respective group of transmission channels. For each data stream, TX data processor 114 codes the data in accordance with a particular coding scheme, interleaves the coded data in accordance with a particular interleaving scheme, and modulates the interleaved data in accordance with a particular modulation scheme. The modulation (i.e., symbol mapping) may be achieved by grouping sets of coded and interleaved bits to form multi-bit symbols and mapping each multi-bit symbol to a point in a signal constellation corresponding to the selected modulation scheme (e.g., QPSK, M-PSK, or M-QAM). Each mapped signal point corresponds to a modulation symbol.

In an embodiment, for each data stream, the data rate is determined by a data rate control, the coding scheme is determined by a coding control, and the modulation scheme is determined by a modulation control. The controls are provided by a controller 130 based on feedback information received from a receiver 150.

A pilot may also be transmitted to the receiver to assist it perform a number of functions such as channel estimation, acquisition, frequency and timing synchronization, coherent data demodulation, and so on. In this case, pilot data is provided to TX data processor 114, which then processes and multiplexes the pilot data with the traffic data.

For OFDM, within a transmitter (TMTR) 116, the modulated data (i.e., the modulation symbols) to be transmitted from each transmit antenna is transformed to the time domain by an inverse fast Fourier transform (IFFT) unit to provide OFDM symbols. Each OFDM symbol is a time representation of a vector of $N_F$ modulation symbols to be transmitted on $N_F$ frequency subchannels of one transmit antenna in a transmission symbol period. In contrast to a single carrier "time-coded" system, an OFDM system effectively transmits the modulation symbols "in the frequency domain", by sending in the time domain the IFFT of the modulation symbols for the traffic data.

Transmitter 116 provides an OFDM symbol stream for each transmit antenna used for data transmission. Each OFDM symbol stream is further processed (not shown in FIG. 1A for simplicity) to generate a corresponding modulated signal. Each modulated signal is then transmitted from a respective transmit antenna over a wireless communication channel to the receiver. The communication channel distorts the modulated signals with a particular channel response and further degrades the modulated signals with additive white Gaussian noise (AWGN) having a variance of $N_0$.

At receiver 150, the transmitted modulated signals are received by each receive antenna, and the received signals from all receivers are provided to a receiver (RCVR) 160. Within receiver 160, each received signal is conditioned and digitized to provide a corresponding stream of samples. For each sample stream, a fast Fourier transformer (FFT) receives and transforms the samples to the frequency domain to provide a corresponding received symbol stream. The received symbol streams are then provided to a receive (RX) data processor 162.

RX data processor 162 processes the received symbol streams to provide decoded data for the transmitted data streams. The processing by RX data processor 162 may include spatial or space-time processing, demodulation (i.e., symbol demapping), deinterleaving, and decoding. RX data processor 162 may further provide the status of each received data packet. Channel estimator 164 processes the "detected" symbols from demodulator/decoder 162 to provide estimates of one or more characteristics of the communication channel, such as the channel frequency response, the channel noise variance $N_0$ the signal-to-noise-and-interference ratio (SNR) of the detected symbols, and so on. Typically, only the pilot symbols are used to obtain estimates of the SNR. However, the SNR may also be estimated based on data symbols, or a combination of pilot and data symbols, and this is within the scope of the invention.

A rate selector 166 receives the channel estimates from channel estimator 164 and possibly other parameters and determines a suitable "rate" for each data stream. The rate is indicative of a set of parameter values to be used for subsequent transmission of the data stream. For example, the rate may indicate (or may be associated with) a specific data rate to be used for the data stream, a specific coding scheme and/or coding rate, a specific modulation scheme, and so on.

A controller 170 receives the rate(s) from rate selector 166 and the packet status from RX data processor 162 and provides the appropriate feedback information to transmitter 110. This feedback information may include the rate(s), the channel estimates, some other information, or any combination thereof. The feedback information may be used to increase the efficiency of the system by adjusting the processing at the transmitter such that data is transmitted at the best known settings of power and rates supported by the communication channel. The feedback information is then sent back to transmitter 110 and used to adjust the processing of the data transmission to receiver 150. For example, transmitter 110 may adjust the data rate, the coding scheme, the modulation scheme, or any combination of the above (based on the feedback information) for each data stream to be transmitted to receiver 150.

In the embodiment shown in FIG. 1A, the rate selection is performed by receiver 150 and the selected rate for each data stream is provided to transmitter 110. In other embodiments, the rate selection may be performed by the transmitter based on feedback information provided by the receiver, or may be performed jointly by both the transmitter and receiver.

In a single-carrier communication system, the transmitted symbols may all be received at similar SNR at the receiver. The relationship between the SNR of a "constant SNR" data packet and the probability of error (PE) for the packet is well known in the art. As an approximation, the maximum data rate supported by the single-carrier system with a particular SNR may be estimated as the maximum data rate supported by an AWGN channel with the same SNR. The main characteristic of the AWGN channel is that its frequency response is flat or constant across the entire system bandwidth.

However, in a multi-channel communication system, the modulation symbols that make up a data packet may be transmitted across multiple frequency subchannels and/or multiple spatial subchannels. Typically, the communication channel between the transmitter and receiver is not flat, but is instead dispersive or frequency selective, with different amounts of attenuation at different sub-bands of the system bandwidth. Moreover, for a MIMO channel, the frequency response for each spatial subchannel may be different from that of the other spatial subchannels. Thus, depending on the characteristics of the transmission channels used to transmit the packet, the SNR may vary across the entire packet. This problem of "varying SNR" packet is exacerbated for wider system bandwidth and for a multipath channel. For the multipath channel, the data rate to use for each data stream may be selected to account for the multipath or frequency selective nature of the communication channel.

A major challenge for a multi-channel communication system is then to determine the maximum data rate that may be used for each data stream while achieving a particular level of performance, which may be quantified by a particular packet error rate (PER), frame error rate (FER), block error rate (BLER), bit error rate (BER), or any other criterion that may be used to quantify performance. For example, the desired level of performance may be achieved by maintaining the PER within a small window around a particular nominal value (e.g., $P_e = 1\%$).

Techniques are provided herein to control the rate of data transmission in a multi-channel communication system with multipath channel. In an aspect, the rate of each data stream is determined based on a metric associated with the data stream. This metric may be derived based on an equivalent system that models the group of transmission channels used for the data stream, as described in further detail below.

Figure 1B:
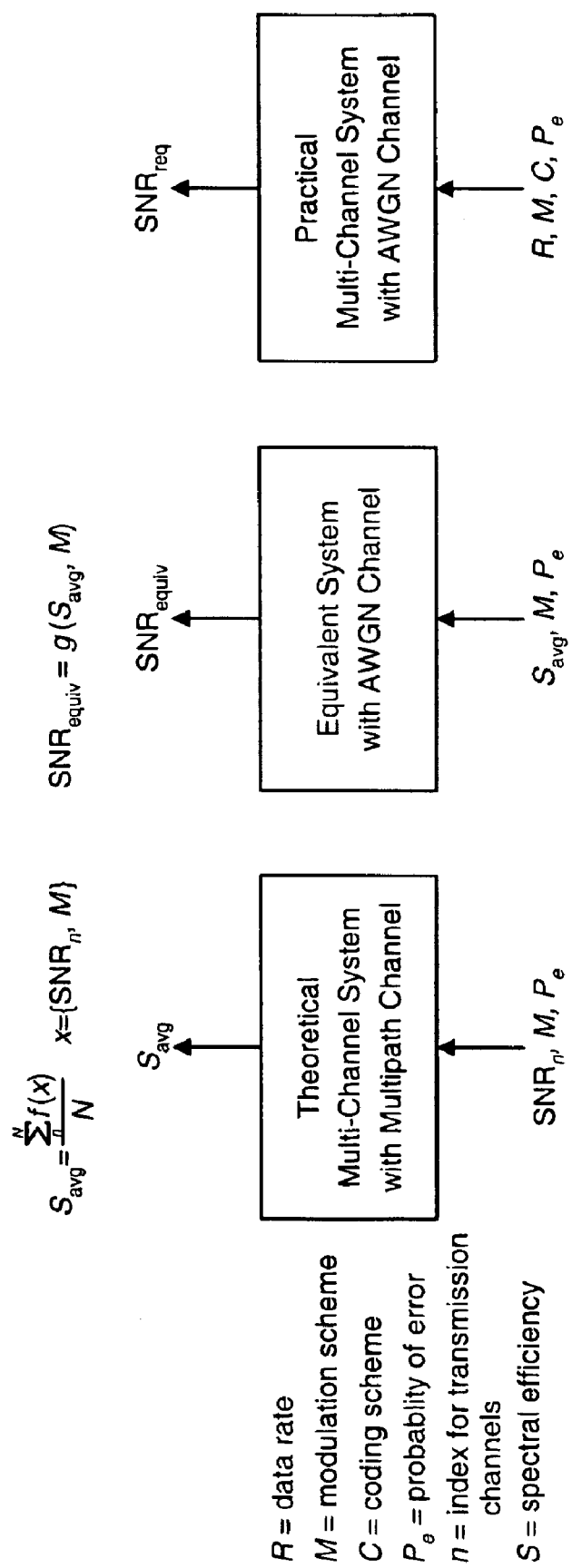
FIG. 1B is a diagram that graphically illustrates rate selection for a multi-channel communication system with multipath channel based on an equivalent system.

FIG. 1B is a diagram that graphically illustrates rate selection for a multi-channel communication system with multipath channel based on an equivalent system. For a given multipath channel defined by a channel response of $h(k)$ and a noise variance of $N_0$, a theoretical multi-channel system may be capable of supporting a spectral efficiency of $S_{avg}$ using modulation scheme M, where M may be different for different frequency subchannels. As used herein, spectral efficiency represents the general concept of "capacity per dimension", where the dimension may be frequency and/or space. Spectral efficiency is normally given in units of bits per second per Hertz (bps/Hz). As used herein, a theoretical system is one without any losses, and a practical system is one with (1) implementation losses, e.g., due to hardware imperfections, and (2) code loss due to the fact that practical codes do not work at capacity. This $S_{avg}$ relates to the average spectral efficiency of the theoretical system given the channel conditions $h(k)$ and $N_0$. The average spectral efficiency $S_{avg}$ may be determined based on a spectral efficiency function $f(x)$, where x denotes a set of input parameters for the function $f(.)$, as described below.

An equivalent system with an AWGN channel is able to support the spectral efficiency of $S_{avg}$ with an SNR of $SNR_{equiv}$. This equivalent system is also a theoretical system. The equivalent SNR, $SNR_{equiv}$, may be derived for spectral efficiency of $S_{avg}$ using modulation scheme M and based on a function $g(x)=f^{-1}(x)$, where $f^{-1}(x)$ is an inverse function of $f(x)$.

A practical multi-channel system with an AWGN channel is able to support data rate R using modulation scheme M and coding scheme C for a PER of $P_e$ with an SNR of $SNR_{req}$. This data rate R is normalized to bits/sec/Hertz, which is the same unit used for spectral efficiency. The required SNR, $SNR_{req}$, may be determined based on computer simulation, empirical measurement, or some other means, and may be stored in a table. The function of required SNR versus data rate is dependent on the specific modulation scheme M and coding scheme C selected for use. A data rate is deemed to be supported by the practical multi-channel system with multipath channel if the required SNR for the data rate is less than the equivalent SNR. As data rate R increases, the required SNR increases for the practical system while the equivalent SNR is approximately constant (except for the variation due to a dependency on modulation scheme M) since it is defined by the channel conditions h(k) and $N_0$. The maximum data rate that may be supported by the practical multi-channel system with the multipath channel is thus limited by the channel conditions.

For clarity, the rate control is first described for a single-input single-output (SISO) system, then expanded to cover a single-input multiple-output (SIMO) system, and then finally to a MIMO system. In the following description, the SISO, SIMO, and MIMO systems all employ OFDM.

SISO System

For the SISO-OFDM system, there is only one spatial subchannel and the channel response is defined by $\{h(k)\}$, for $k=0, 1, \ldots (N_F-1)$. For a multipath channel with channel response of $\{h(k)\}$ and noise variance of $N_0$, these parameters may be mapped to an SNR(k) for each frequency subchannel k. If the total transmit power, $P_{total}$, for the SISO-OFDM system is fixed and the allocation of the transmit power to the $N_F$ frequency subchannels is uniform and fixed, then the SNR of each frequency subchannel k may be expressed as:

$$SNR(k) = \frac{P_{total}}{N_F} \frac{|h(k)|^2}{N_0}. \quad \text{Eq (1)}$$

The spectral efficiency of each frequency subchannel k with SNR(k) may be estimated based on the function $f(x)$, which may be a constrained or unconstrained spectral efficiency function. The absolute or unconstrained spectral efficiency of a system is typically given as the theoretical maximum data rate that may be reliably transmitted over a channel with a given channel response and noise variance. The constrained spectral efficiency of a system is further dependent on the specific modulation scheme or signal constellation used for data transmission. The constrained spectral efficiency (due to the fact that the modulation symbols are restricted to specific points on the signal constellation) is lower than the absolute spectral efficiency (which is not confined by any signal constellation).

In one embodiment, the function $f(x)$ may be defined based on the constrained spectral efficiency function $f_{const}(k)$, which may be expressed as:

$$f_{const}(k) = M_k - \frac{1}{2^{M_k}}\sum_{i=1}^{2^{M_k}} E\left[\log_2 \sum_{j=1}^{2^{M_k}} \exp\left(-SNR(k)(|a_i - a_j|^2 + 2\text{Re}\{\beta^*(a_i - a_j)\})\right)\right], \quad \text{Eq (2)}$$

where
- $M_k$ is related to modulation scheme M(k), i.e., modulation scheme M(k) corresponds to a $2^{M_k}$-ary constellation (e.g., $2^{M_k}$-ary QAM), where each of the $2^{M_k}$ points in the constellation may be identified by $M_k$ bits;
- $a_i$ and $a_j$ are the points in the $2^{M_k}$-ary constellation;
- $\beta$ is a complex Gaussian random variable with zero mean and a variance of $1/SNR(k)$; and
- E[.] is the expectation operation, which is taken with respect to the variable $\beta$ in equation (2).

Equation (2) shows that a different modulation scheme M(k) may be used for each frequency subchannel. For simplicity, one modulation scheme M may be used for all $N_F$ frequency subchannels for data rate R (i.e., M(k)=M for all k).

The constrained spectral efficiency function $f_{const}(k)$ shown in equation (2) does not have a closed form solution. Thus, this function may be numerically derived for various modulation schemes and SNR values, and the results may be stored in one or more tables. Thereafter, the function $f_{const}(k)$ may be evaluated by accessing the proper table with a specific modulation scheme and SNR.

In another embodiment, the function $f(x)$ is defined based on the Shannon (or theoretical) spectral efficiency function $f_{unconst}(k)$, which may be expressed as:

$$f_{unconst}(k) = \log_2[1 + SNR(k)] \quad \text{Eq (3)}$$

As shown in equation (3), the Shannon spectral efficiency is not constrained by any given modulation scheme (i.e., M(k) is not a parameter in equation (3)).

The spectral efficiency functions provide the spectral efficiency of a system based on the set of input parameters. These spectral efficiency functions are related to channel capacity functions, which provide the (constrained or unconstrained) capacity of a channel. Spectral efficiency (which is typically given in units of bps/Hz) is related to capacity (which is typically given in bps) and may be viewed as being equal to normalized capacity.

The particular choice of function to use for $f(x)$ may be dependent on various factors. For a typical system that employs one or more specific modulation schemes, it has been found that the use of the constrained spectral efficiency function $f_{const}(k)$ for the function $f(x)$ results in accurate estimation of the maximum data rate supported by the SISO-OFDM system with multipath channel.

In a typical communication system, a set of discrete data rates, $R=\{R(r), r=1, 2, \ldots P\}$, may be defined, and only these data rates may be available for use. Each data rate $R(r)$ in set R may be associated with a specific modulation scheme or signal constellation M(r) and a specific coding rate C(r). Each data rate would further require an SNR of $SNR_{req}(r)$ or better to achieve the desired PER of $P_e$. This $SNR_{req}(r)$ is determined for the practical SISO-OFDM system with an AWGN channel.

Each data rate R(r) may thus be associated with a set of parameters that characterizes it. These parameters may include the modulation scheme M(r), the coding rate C(r), and the required $SNR_{req}(r)$, as follows:

$$R(r) \Leftrightarrow [M(r), C(r), SNR_{req}(r)] \qquad \text{Eq (4)}$$

where r is an index for the data rates, i.e., r=1, 2, ..., P, and P is the total number of data rates available for use. Expression (4) states that data rate R(r) may be transmitted using modulation scheme M (r) and coding rate C(r) and further requires $SNR_{req}(r)$ to achieve the desired PER of $P_e$.

Figure 2:
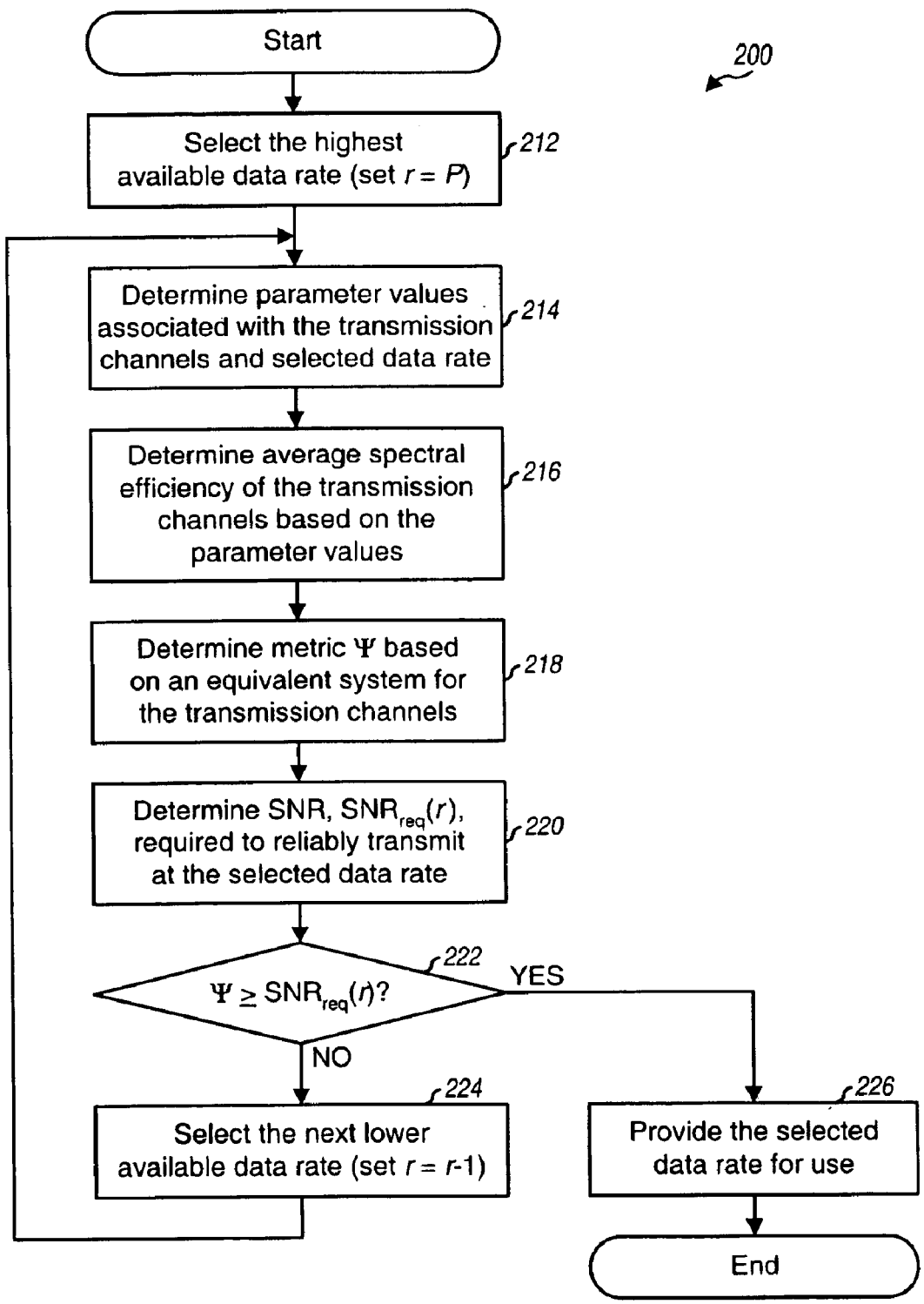
FIG. 2 is a flow diagram of an embodiment of a process for determining the maximum data rate supported by a SISO-OFDM system based on an equivalent system.

FIG. 2 is a flow diagram of an embodiment of a process 200 for determining the maximum data rate supported by the SISO-OFDM system based on an equivalent system. For this embodiment, the constrained spectral efficiency function shown in equation (2) is used for $f(x)$ to determine the average spectral efficiency of the transmission channels used for data transmission. Since each data rate R(r) may be associated with a different modulation scheme M(r), and since the constrained spectral efficiency function is dependent on M(r), the average spectral efficiency of the transmission channel may be different for different data rates. The equivalent system is dependent on the average spectral efficiency and is thus determined for each data rate in FIG. 2.

Initially, the P data rates supported by the SISO-OFDM system may be ordered such that R(1)<R(2)< ... <R(P). The highest available data rate R(P) is then selected (e.g., by setting the variable r to the index for the highest data rate, i.e., r=P) (step 212). Parameter values associated with (1) the transmission channels used for data transmission, such as the channel response h(k) and the noise variance $N_0$, and (2) the selected data rate R(r), such as the modulation scheme M(r), are then determined (step 214). Depending on the design of the SISO-OFDM system, each data rate may be associated with one or multiple modulation schemes. For simplicity, the following assumes that only one modulation scheme is associated with each data rate.

The average spectral efficiency $S_{avg}$ of the transmission channels is then determined (step 216). This may be achieved by first determining the SNR(k) of each transmission channel, as shown above in equation (1). Using the constrained spectral efficiency function, the spectral efficiency of each transmission channel is then estimated for SNR(k) and modulation scheme M(r), as shown in equation (2). The spectral efficiencies of the $N_F$ frequency subchannels are then averaged to obtain the average spectral efficiency $S_{avg}$, as follows:

$$S_{avg} = \frac{\sum_{k=0}^{N_F-1} f(x)}{N_F}. \qquad \text{Eq (5)}$$

Figure 3:
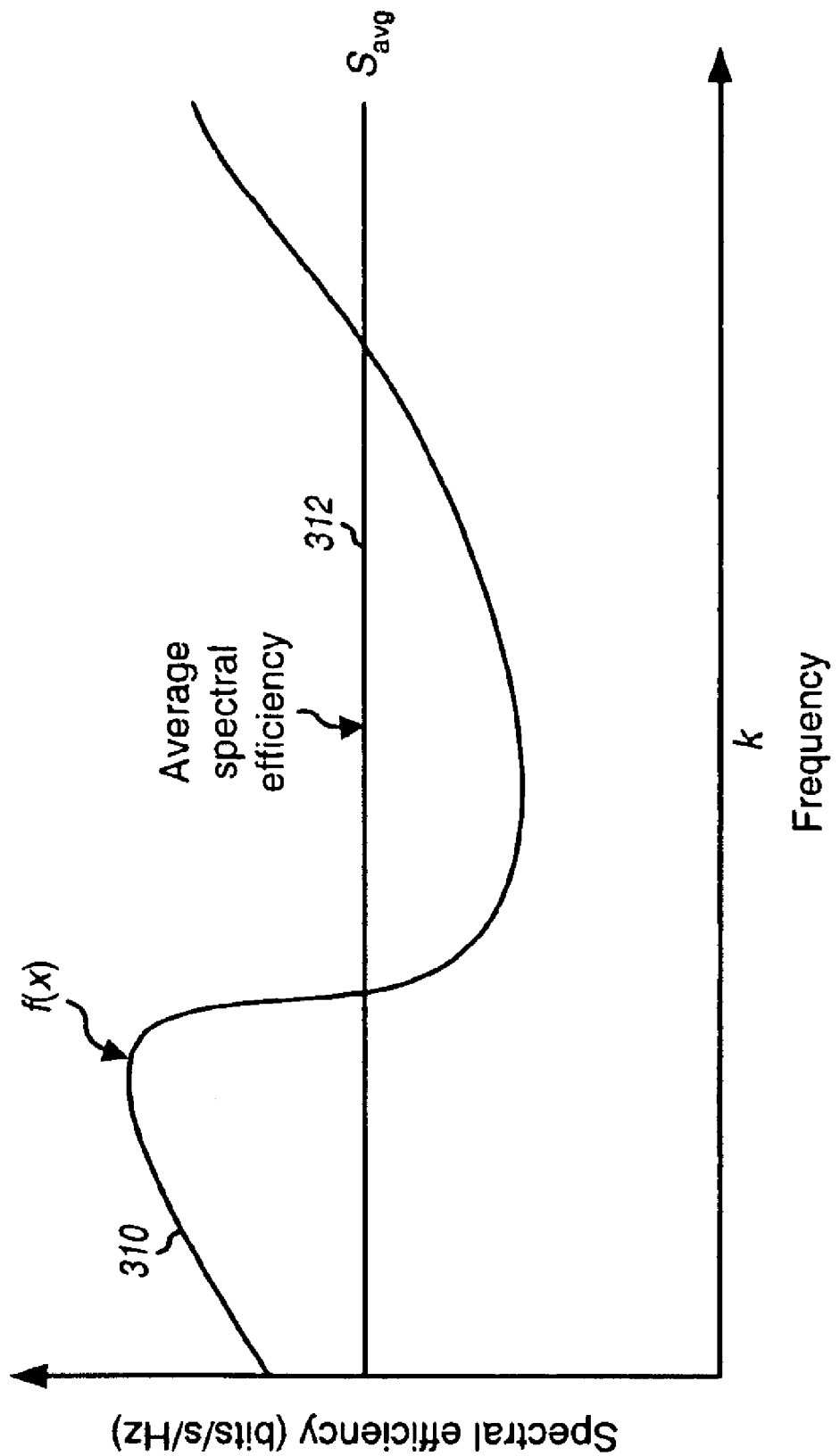
FIG. 3 is a diagram illustrating the spectral efficiency of the SISO-OFDM system with a multipath channel.

FIG. 3 is a diagram illustrating the spectral efficiency of the SISO-OFDM system with the multipath channel. For a multipath channel with varying SNR across the system bandwidth, the SISO-OFDM system is associated with different spectral efficiencies for different frequency subchannels, as shown by plot 310. The spectral efficiencies of all $N_F$ frequency subchannels used for data transmission may be averaged to obtain the average spectral efficiency $S_{avg}$, which is shown by plot 312. The average spectral efficiency, $S_{avg}$, may be viewed as the spectral efficiency for each of the $N_F$ frequency subchannels in the SISO-OFDM system if the communication channel is an AWGN channel instead of a multipath channel. The constrained or unconstrained spectral efficiency function may thus be used to map a multipath channel to an equivalent AWGN channel.

Referring back to FIG. 2, a metric $\Psi$ is then determined based on an equivalent system (step 218). The equivalent system is defined to have an AWGN channel and an average spectral efficiency $S_{equiv}$ that is equal to the average spectral efficiency of the SISO-OFDM system with the multipath channel (i.e., $S_{equiv}=S_{avg}$) The SNR needed by the equivalent system to support a data rate of $S_{equiv}$ may then be determined based on the inverse of the function used to derive the $S_{avg}$, which in this case is the constrained spectral efficiency function. The metric $\Psi$ may then be set equal to the equivalent SNR, as follows:

$$\Psi = g(x) = f^{-1}(x) \qquad \text{Eq (6)}$$

where $f^{-1}(x)$ denotes the inverse function of $f(x)$. The metric $\Psi$ and the equivalent SNR are both indicative of the "goodness" of the $N_F$ frequency subchannels.

The constrained spectral efficiency function $f(x)$ takes two inputs, SNR(k) and M(r), and maps them to a spectral efficiency value. The inverse constrained spectral efficiency function $f^{-1}(x)$ takes two inputs, $S_{avg}$ and M(r), and maps them to an SNR value. The function $g(S_{avg}, M(r))$ thus determines the SNR needed in the equivalent system to support a spectral efficiency equal to the average spectral efficiency $S_{avg}$ given that constellation M(r) is used. The metric $\Psi$ may thus be determined once for each modulation scheme (i.e., each signal constellation). The function g(x) may also be determined for various modulation schemes and stored in a table.

The required SNR, $SNR_{req}(r)$, needed to transmit the selected data rate R(r) at the desired PER of $P_e$ by the practical SISO-OFDM system is then determined (step 220). The required SNR is a function of the modulation scheme M(r) and coding rate C(r) associated with the selected data rate R(r). The required SNR may be determined for each of the possible data rates by computer simulation, empirical measurements, or by some other means, and may be stored in a table for later use.

A determination is then made whether or not the selected data rate R(r) is supported by the SISO-OFDM system (step 222). This may be achieved by comparing the metric $\Psi$ against the required SNR determined for the selected data rate. If the metric $\Psi$ is greater than or equal to the required SNR (i.e., $\Psi \geq SNR_{req}(r)$), which indicates that the SNR achieved by the SISO-OFDM system for the multipath channel is sufficient to support data rate R(r) for the desired PER of $P_e$, then that data rate is selected for use (step 226). Otherwise, the next lower available data rate is selected for evaluation (e.g., by decrementing the variable r, or r=r−1) (step 224). This next lower data rate is then evaluated by returning to step 214. Steps 214 through 222 may be repeated as often as needed until either (1) the maximum supported data rate is identified and provided in step 226 or (2) all available data rates have been evaluated.

The metric $\Psi$ is dependent on the channel conditions (e.g., h(k) and $N_0$) and the modulation scheme M(r) if the constrained spectral efficiency function is used. The required SNR is a monotonic function that increases with increasing data rate. The embodiment shown in FIG. 2 evaluates the available data rates, one at a time, from the maximum available data rate to the minimum available data rate. The highest data rate associated with a required SNR that is less than or equal to the metric $\Psi$ is selected for use.

The metric $\Psi$ may be determined based on equations (2), (5), and (6). In equation (5), a summation is performed for $f(x)$ to accumulate the spectral efficiencies of the individual frequency subchannels to provide the spectral efficiency for the $N_F$ frequency subchannels. The average spectral efficiency $S_{avg}$ is then obtained by dividing the spectral efficiency for the $N_F$ frequency subchannels by the number of frequency subchannels. The function $g(S_{avg}, M(r))$ then determines the equivalent SNR for the equivalent system needed to reliably transmit data at a spectral efficiency equal to the average spectral efficiency $S_{avg}$ using modulation scheme M(r).

Equation (5) assumes that the same modulation scheme M(r) is used for all $N_F$ frequency subchannels in the SISO-OFDM system. This restriction can simplify the processing at the transmitter and receiver in the system but may sacrifice performance.

The metric $\Psi$ may also be defined for the case in which different modulation schemes are used for different frequency subchannels. The use of different modulation schemes and/or coding rates for different frequency subchannels is often referred to as "bit loading".

In FIG. 2, the equivalent system is determined for each data rate being evaluated. This implementation covers a scheme whereby different data rates may be associated with different modulation schemes. However, if different data rates are associated with the same modulation scheme, then the equivalent system only needs to be determined for each different modulation scheme that may be used with the data rates being evaluated. This would then simplify the computation.

As a further simplification, if the average spectral efficiency $S_{avg}$ of the frequency subchannels is only dependent on SNR(k) and not on the modulation scheme, which would be the case if the unconstrained spectral efficiency function is used for $f(x)$, then the equivalent system only needs to be evaluated once, instead of for each data rate evaluated. The equivalent SNR for the equivalent system can be determined once in the manner described above. Thereafter, the required SNR for each data rate (starting with the highest data rate) may be compared against the equivalent SNR.

In an alternative embodiment, the metric $\Psi$ is defined as a post-detection SNR achieved for the multipath channel by a single-carrier communication system after equalization. The post-detection SNR is representative of the ratio of the total signal power to the noise plus interference after equalization at the receiver. Theoretical values of post-detection SNR achieved in the single-carrier system with equalization may be indicative of the performance of a SISO-OFDM system, and therefore may be used to determine the maximum supported data rate in the SISO-OFDM system. Various types of equalizer may be used to process the received signal in the single-carrier system to compensate for distortions in the received signal introduced by the multipath channel. Such equalizers may include, for example, a minimum mean square error linear equalizer (MMSE-LE), a decision feedback equalizer (DFE), and others.

The post-detection SNR for an (infinite-length) MMSE-LE may be expressed as:

$$SNR_{mmse-le} = \frac{1 - J_{min}}{J_{min}}, \quad \text{Eq (7a)}$$

where $J_{min}$ is given by $$J_{min} = \frac{T}{2\pi} \int_{-\pi/T}^{\pi/T} \frac{N_0}{X(e^{j\omega T}) + N_0} d\omega, \quad \text{Eq (7b)}$$

where $X(e^{j\omega T})$ is the folded spectrum of the channel transfer function H(f).

The post-detection SNR for an (infinite-length) DFE may be expressed as:

$$SNR_{dfe} = \exp\left[\frac{T}{2\pi} \int_{-\pi/T}^{\pi/T} \ln\left(\frac{X(e^{j\omega T}) + N_0}{N_0}\right) d\omega\right] - 1. \quad \text{Eq (8)}$$

The post-detection SNRs for the MMSE-LE and DFE shown in equations (7) and (8), respectively, represent theoretical values. The post-detection SNRs for the MMSE-LE and DFE are also described in further detail by J. G. Proakis, in a book entitled "Digital Communications", 3rd Edition, 1995, McGraw Hill, sections 10-2-2 and 10-3-2, respectively, which are incorporated herein by reference.

The post-detection SNRs for the MMSE-LE and DFE may also be estimated at the receiver based on the received signal, as described in U.S. patent application Ser. Nos. 09/826,481 and 09/956,449, both entitled "Method and Apparatus for Utilizing Channel State Information in a Wireless Communication System," respectively filed Mar. 23, 2001 and Sep. 18, 2001, and U.S. patent application Ser. No. 09/854,235, entitled "Method and Apparatus for Processing Data in a Multiple-Input Multiple-Output (MIMO) Communication System Utilizing Channel State Information," filed May 11, 2001, all assigned to the assignee of the present application and incorporated herein by reference.

Post-detection SNRs, such as those described by the analytical expressions shown in equations (7) and (8), may be determined for the multipath channel and used as an estimate of the metric $\Psi$ (i.e., $\Psi \approx SNR_{mmse-le}$ or $\Psi \approx SNR_{dfe}$). The post-detection SNR (e.g., $SNR_{mmse-le}$ or $SNR_{dfe}$) for the equivalent AWGN channel may be compared against the required SNR, $SNR_{req}(r)$, derived for a particular set of parameter values, R(r), M(r), C(r), and $P_e$, to determine the data rate that may be used in the SISO-OFDM system with multipath channel.

The equivalent system that models the transmission channels used for a data stream may be defined to have an AWGN channel and a spectral efficiency equal to the average spectral efficiency of the transmission channels. The equivalent system may also be defined based on the post-detection SNR achieved for the multipath channel by a single-carrier communication system. The equivalent system may also be defined in some other manner, and this is within the scope of the invention. The metric $\Psi$ may also be defined based on some other functions and/or in some other manner, and this is within the scope of the invention.

The data rate selected for use in the SISO-OFDM system using the metric $\Psi$ represents a prediction of the data rate that may be supported by the multipath channel for the desired PER of $P_e$. As with any rate prediction scheme, there will inevitably be prediction errors. In order to ensure that the desired PER can be achieved, the prediction errors may be estimated and a back-off factor may be used in determining the data rate that can be supported by the multipath channel. This back off reduces the throughput of the system. Thus, it is desirable to keep this back off as small as possible while still achieving the desired PER. An accurate prediction scheme like the one described herein will minimize the back off to be applied and hence maximize the system capacity.

Figure 4A:
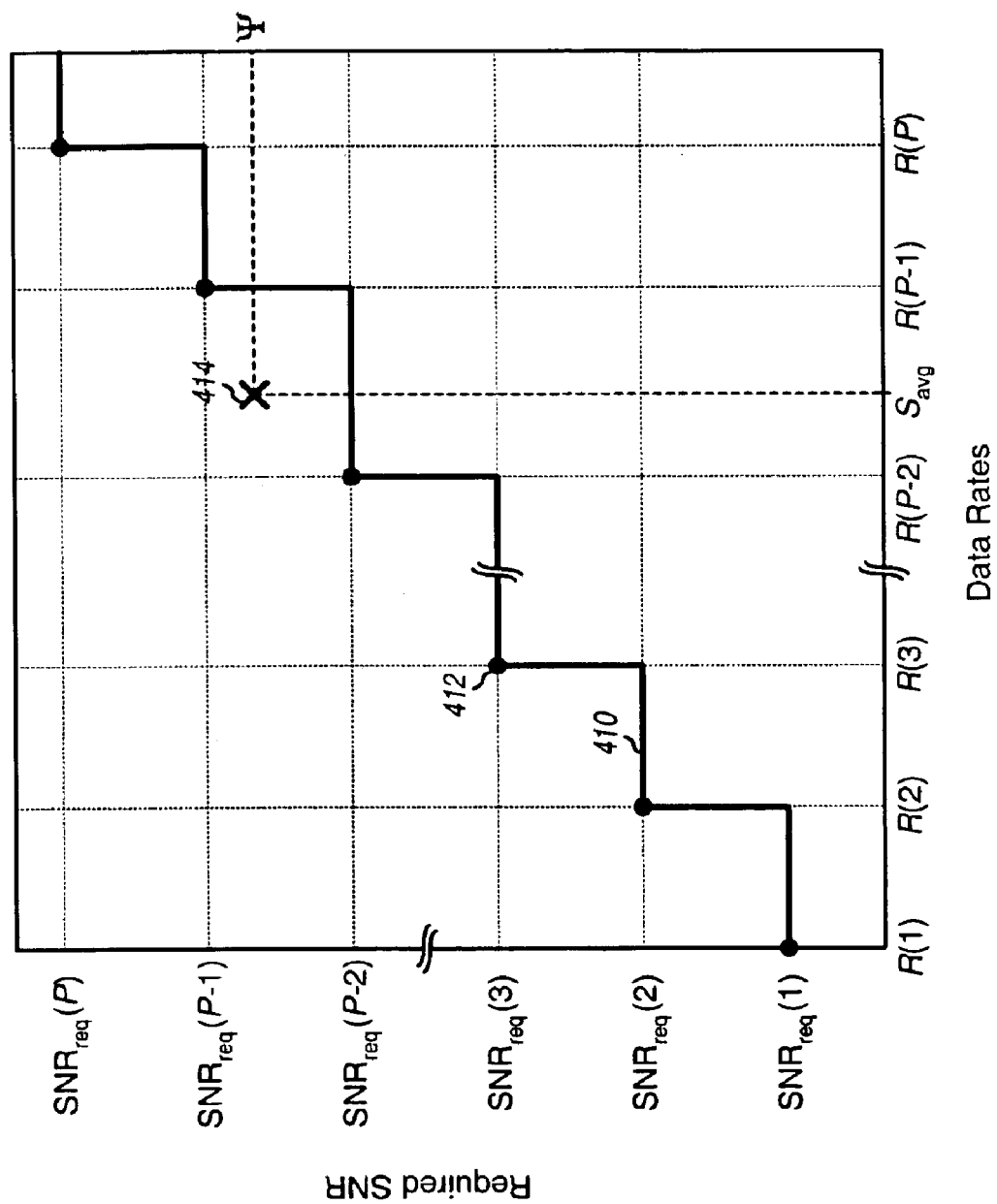
FIG. 4A shows a plot of required SNRs versus data rates for a system that supports a set of discrete data rates.

FIG. 4A shows a plot of required SNRs versus data rates for a system that supports a set of discrete data rates. In FIG. 4A, the discrete data rates are labeled as R(r), for r=1, 2, . . . P, on the horizontal axis. Each data rate R(r) is associated with a respective SNR required to achieve the desired PER of $P_e$ for the system with an AWGN channel. The required SNRs are labeled as $SNR_{req}(r)$ on the vertical axis. The discrete operating points at $(R(r), SNR_{req}(r))$, for $r=1, 2, \ldots P$, correspond to the minimum SNRs required to support the corresponding data rates, and are shown by the solid circles 412. A spectral efficiency function for this system is represented by plot 410 (the thick solid line).

For a given multipath channel, the average spectral efficiency $S_{avg}$ may be determined as shown in equation (5), and the metric $\Psi$ for this average spectral efficiency may be determined as shown in equation (6). Graphically, $\Psi$ and $S_{avg}$ may be represented by a point 414 in FIG. 4A, which is marked with an "x". If this point is in the shaded region above plot 410, then the selected data rate associated with $\Psi$ and $S_{avg}$ is deemed to be supported by the system.

It may be necessary to back off the selected data rate since it is based on a theoretical value. For example, code loss and implementation losses may result in a higher required SNR to achieve the desired PER. Implementation losses due to imperfections in the receiver's pre-decoder stages will show up in the SNR, and losses due to imperfections in the decoder and the transmitter are typically negligible. The amount of code loss versus capacity may be estimated and accounted for with a back off. The amount of back off to be used to account for code loss may be determined as described below.

Figure 4B:
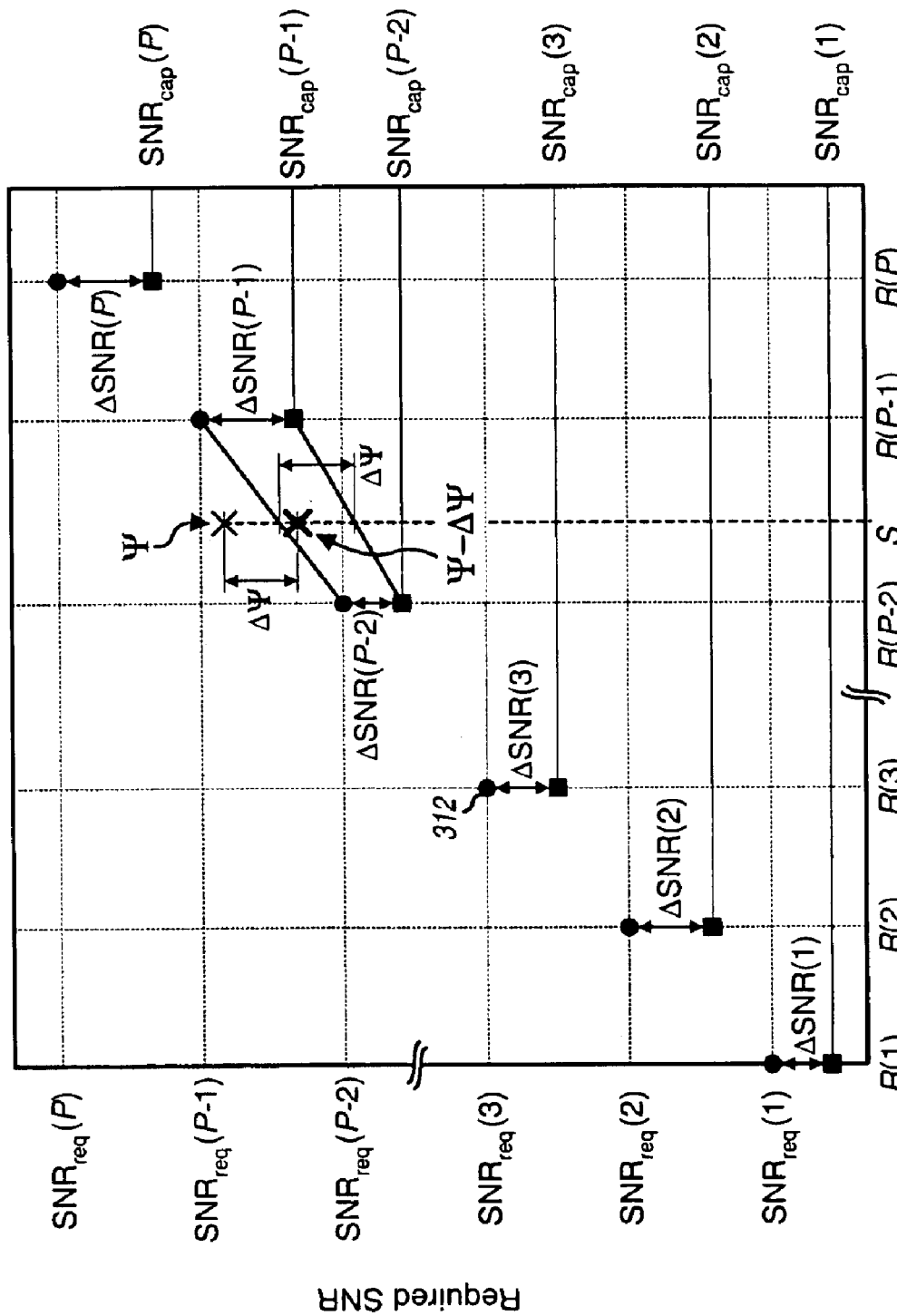
FIG. 4B graphically illustrates the determination of the amount of back off to use when evaluating whether or not a particular data rate is supported.

FIG. 4B graphically illustrates the determination of the amount of back off to use when evaluating whether or not a particular data rate is supported. As described above, the set $\{SNR_{req}(r)\}$, for $r=1, 2, \ldots P$, represents the SNR required in a practical system to obtain the desired PER of $P_e$. An ideal SNR may be determined for each data rate based on the (constrained or unconstrained) spectral efficiency function and is shown on the right vertical axis. The set $\{SNR_{cap}(r)\}$, for $r=1, 2, \ldots P$, represents the SNR required in an ideal system (i.e., with no implementation losses) to obtain the desired PER of $P_e$. It can be noted that $SNR_{cap}(r) < SNR_{req}(r)$ for all r, since $SNR_{cap}(r)$ is the required SNR for an ideal system while $SNR_{req}(r)$ is the required SNR for a practical system. A set $\{\Delta SNR(r)\}$, for $r=1, 2, \ldots P$, may be defined to represent the additional SNR required for the practical system to account for losses in the practical system (which mainly include code loss).

The average spectral efficiency $S_{avg}$ determined in equation (5) will lie between two consecutive data rates, e.g., $R(r)$ and $R(r+1)$, which have been normalized to bits/sec/Hertz. The corresponding back offs in SNR at these two data rates are $\Delta SNR(r)$ and $\Delta SNR(r+1)$, respectively. In an embodiment, the amount of back off to use for the metric $\Psi$ may be determined by linear interpolation of $\Delta SNR(r)$ and $\Delta SNR(r+1)$, as follows:

$$\Delta\Psi = \frac{\Delta SNR(r)[R(r+1) - C_{avg}] + \Delta SNR(r+1)[C_{avg} - R(r)]}{R(r+1) - R(r)}. \qquad \text{Eq (9)}$$

A backed-off metric, $\Psi_{BO}$, may then be expressed as:

$$\Psi_{BO} = \Psi - \Delta\Psi \qquad \text{Eq (10)}$$

Referring back to FIG. 2, the backed-off metric, $\Psi_{BO}$, (instead of the metric $\Psi$) may be compared against the required SNR in step 222 to determine whether or not the selected data rate $R(r)$ is supported by the SISO-OFDM system.

SIMO System

For a SIMO system, $N_R$ receive antennas are used to receive a data transmission from a single transmit antenna. The channel response between the single transmit antenna and the $N_R$ receive antennas may be represented as $\underline{h}(k)$ or $\{h_i(k)\}$ for $i=1, 2, \ldots N_R$ and $k=0, 1, \ldots (N_F-1)$, where $h_i(k)$ is the coupling (i.e., the complex gain) between the transmit antenna and the i-th receive antenna for the k-th frequency subchannel.

The spectral efficiency function for a $(1, N_R)$ SIMO system is the same as that for a SISO system, except that the received SNR for the SIMO system is obtained by a summation of all the received SNRs for the $N_R$ received antennas. Thus, the received SNR for the k-th frequency subchannel in a SIMO-OFDM system may be expressed as:

$$SNR(k) = \frac{\sum_{i=1}^{N_R} \|h_i(k)\|^2}{N_0}, \qquad \text{Eq (11)}$$

where the transmit power for each frequency subchannel is normalized to 1. For simplicity, equation (11) assumes that the same noise variance $N_0$ is received on all $N_R$ receive antennas. Equation (11) may be modified to account for different noise variances $N_0$ being received for different receive antennas. In comparison, the received SNR for the k-th frequency subchannel in a SISO-OFDM system may be expressed as shown in equation (1). For the SIMO-OFDM system, the received SNR determined in equation (11) may then be used in the spectral efficiency function $f(x)$. Except for the change in the computation of SNR, the rate control for the SIMO-OFDM system may be performed in similar manner as described above for the SISO-OFDM system.

MIMO System

For a MIMO-OFDM system, the response between the $N_T$ transmit and $N_R$ receive antennas may be described by an $N_R \times N_T$ channel impulse response matrix, $\underline{H}$. The elements of the matrix $\underline{H}$ are composed of channel impulse vectors $\{\underline{h}_{i,j}\}$, for $i=1, 2, \ldots N_R$ and $j=1, 2, \ldots N_T$, where $\underline{h}_{i,j}$ describes the coupling between the j-th transmit antenna and the i-th receive antenna. Each vector $\underline{h}_{i,j}$ is composed of L taps and may be expressed as:

$$\underline{h}_{i,j} = [h_{i,j}(1) h_{i,j}(2) \ldots h_{i,j}(L)]^T \qquad \text{Eq (12)}$$

where each of the L taps may be modeled as a complex Gaussian coefficient for a Rayleigh fading channel. For a given (i,j) transmit-receive antenna pair, the signal transmitted from the j-th transmit antenna may be received by the i-th receive antenna via a number of propagation paths, and the multipath components associated with these propagation paths are assumed to be uncorrelated. This may be expressed as:

$$E[h_{i,j}(p)h^*_{i,j}(q)] = E[|h_{i,j}(p)|^2]\delta_{p-q} \qquad \text{Eq (13)}$$

where p and q represent two multipath components, h* is the complex conjugate of h, and $\delta_{p-q}$ is the Delta-Dirac function that is equal to one only if $p=q$ and equal to zero otherwise. Furthermore, it is assumed that the channel responses for different transmit-receive antenna pairs are uncorrelated, i.e., $$E\left[\underline{h}_{m,n}\underline{h}_{i,j}^H\right] = 0,$$

for different values of m, n, i, and j, where $\underline{h}^H$ represents the conjugate transpose of $\underline{h}$.

The channel impulse response matrix, $\underline{H}(n)$, is a time-domain representation of the MIMO channel response. A corresponding channel frequency response matrix, $\underline{H}(k)$, may be obtained by performing a fast Fourier transform (FFT) on $\underline{H}(n)$, which may be expressed as:

$$\underline{H}(k) = FFT[\underline{H}(n)] \quad \text{Eq (14)}$$

where $k=0, 1, \ldots (N_F-1)$ and $N_F \geq L$. In particular, an $N_F$-point FFT may be performed on a sequence of $N_F$ sampled values for a given element $\underline{h}_{i,j}$ of $\underline{H}$ to derive a sequence of $N_F$ coefficients for the corresponding element $\underline{h}_{i,j}$ of $\underline{H}$. Each element of $\underline{H}$ is thus the FFT of a corresponding element of $\underline{H}$. Each element of $\underline{H}$ is a vector of $N_F$ complex values (i.e., $\underline{h}_{i,j} = [h_{i,j}(0) \; h_{i,j}(1) \; \ldots \; h_{i,j}(N_F-1)]^T$), which are representative of the frequency response of the propagation path for a particular (i,j) transmit-receive antenna pair. The matrix $\underline{H}$ may thus be viewed as comprising a sequence of $N_F$ matrixes $\underline{H}(k)$, for $k=0, 1, \ldots (N_F-1)$, each of dimension $N_R \times N_T$.

For a MIMO-OFDM system, data may be processed and transmitted using numerous processing schemes. Each processing scheme may designate (1) the manner in which data is processed (i.e., encoded, interleaved, and modulated) prior to transmission, and (2) the transmission channels used to transmit each independently processed data stream.

In an all antenna processing (AAP) scheme, one data stream is transmitted over all transmit antennas and frequency subchannels. For this scheme, the data to be transmitted may be encoded, interleaved, modulated, and then demultiplexed into $N_T$ symbol streams for the $N_T$ transmit antennas. For the AAP scheme, a coded data packet may be interleaved in both the frequency and space domains.

In a per-antenna processing (PAP) scheme, one data stream is transmitted over all frequency subchannels of each transmit antenna. For this scheme, the data to be transmitted is first demultiplexed to $N_T$ data streams for the $N_T$ transmit antennas. Each data stream is independently coded, interleaved, modulated, and then transmitted over one of the $N_T$ transmit antennas. The data rates and the coding and modulation schemes may be the same or different for the $N_T$ data streams. For the PAP scheme, each data stream is only interleaved in the frequency domain.

Each independently processed data stream may comprise one or more coded data packets or codewords. Each such codeword is generated at the transmitter by encoding a packet of data based on a particular coding scheme, and may be decoded at the receiver based on a complementary decoding scheme. The decoding of each codeword may be achieved by first recovering the modulation symbols transmitted for that codeword. The processing scheme selected for use at the transmitter affects the processing schemes available for use at the receiver.

The model for the MIMO-OFDM system may be expressed as:

$$\underline{y}(k) = \underline{H}(k)\underline{x}(k) + \underline{n}, \text{ for } k=0, 1, \ldots (N_F-1), \quad \text{Eq (15)}$$

where $\underline{y}(k)$ is a vector of $N_R$ received symbols for the k-th frequency subchannel (i.e., the "received" vector for tone k), which may be represented as $\underline{y}(k) = [y_1(k) \; y_2(k) \ldots y_{N_R}(k)]^T$, where $y_i(k)$ is the entry received by the i-th receive antenna for tone k and $i=1,2,\ldots,N_R$;

$\underline{x}(k)$ is a vector of $N_T$ modulation symbols for tone k (i.e., the "transmitted" vector), which may be represented as $\underline{x}(k) = [x_1(k) \; x_2(k) \ldots x_{N_T}(k)]^T$, where $x_j(k)$ is the modulation symbol transmitted from the j-th transmit antenna for tone k and $j=1, 2, \ldots, N_T$;

$\underline{H}(k)$ is the channel frequency response matrix for the MIMO channel for tone k; and $\underline{n}$ is the additive white Gaussian noise (AWGN) with a mean vector of $\underline{0}$ and a covariance matrix of $\underline{\Lambda}_n = N_0 \underline{I}$, where $\underline{0}$ is a vector of zeros, $\underline{I}$ is the identity matrix with ones along the diagonal and zeros everywhere else, and $N_0$ is the noise variance.

For simplicity, the effects of the OFDM processing at both the transmitter and receiver (which may be negligible) are not shown in equation (15).

Due to scattering in the propagation environment, the $N_T$ symbol streams transmitted from the $N_T$ transmit antennas interfere with each other at the receiver. In particular, a given symbol stream transmitted from one transmit antenna may be received by all $N_R$ receive antennas at different amplitudes and phases. Each received symbol stream may then include a component of each of the $N_T$ transmitted symbol streams. The $N_R$ received symbol streams would collectively include all $N_T$ transmitted symbols streams. However, these $N_T$ symbol streams are dispersed among the $N_R$ received symbol streams.

At the receiver, various processing techniques may be used to process the $N_R$ received symbol streams to detect the $N_T$ transmitted symbol streams. These receiver processing techniques may be grouped into two primary categories:

spatial and space-time receiver processing techniques (which are also referred to as equalization techniques), and "successive nulling/equalization and interference cancellation" receiver processing technique (which is also referred to as "successive interference cancellation" (SIC) processing technique).

The spatial and space-time receiver processing techniques may provide better performance for the AAP scheme, while the SIC processing technique may provide better performance for the PAP scheme. These receiver processing techniques are described in further detail below.

Figure 10:
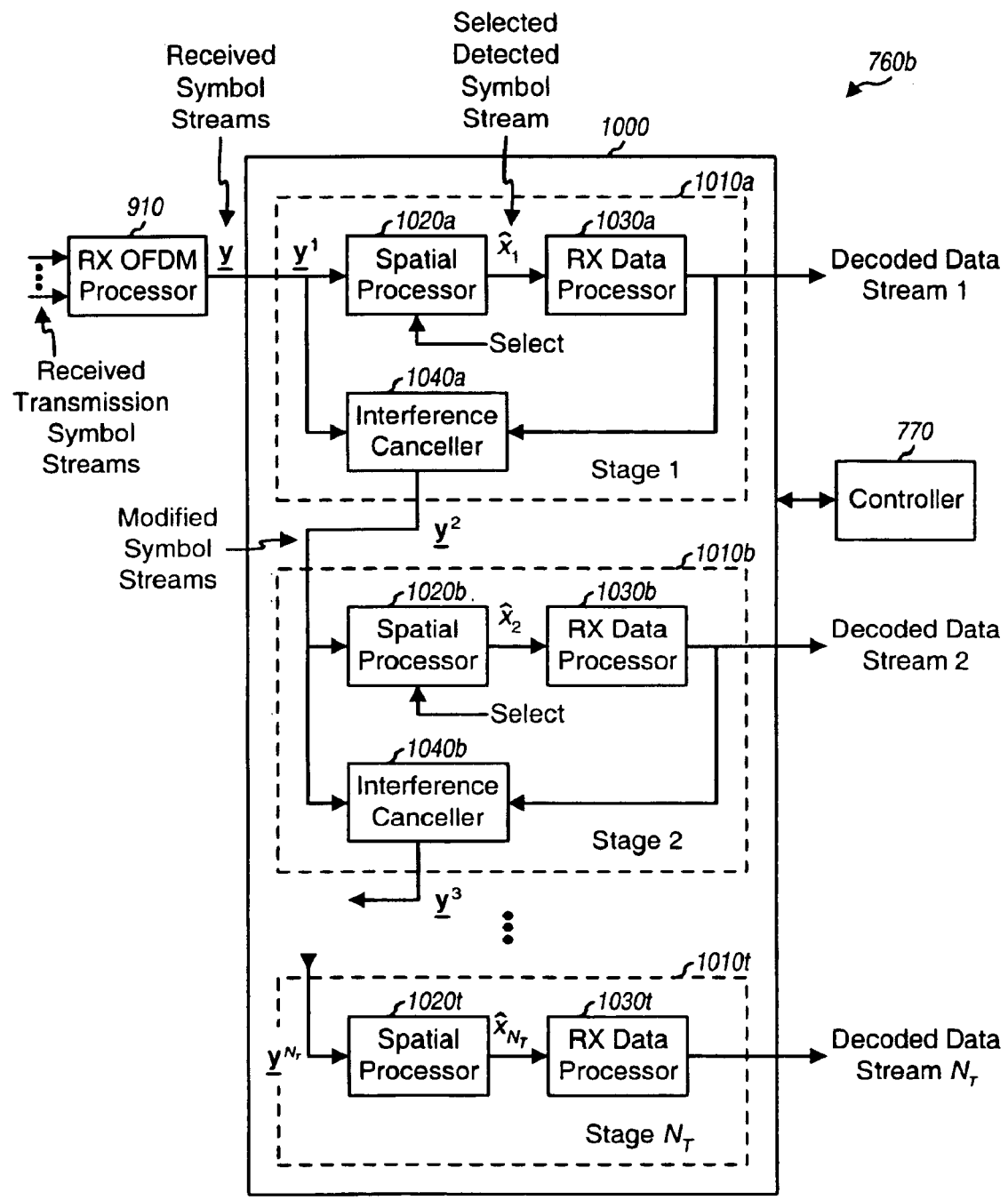

For clarity, the following terminology is used herein:

"transmitted" symbol streams—the modulation symbol streams transmitted from the transmit antennas;

"received" symbol streams—the inputs to a spatial or space-time processor (in the first stage of a SIC receiver, if one is used, as shown in FIG. 10);

"modified" symbol streams—the inputs to the spatial or space-time processor in each subsequent stage of the SIC receiver;

"detected" symbol streams—the outputs from the spatial or space-time processor (up to $N_T-l+1$ symbol streams may be detected at stage l for a SIC receiver); and "recovered" symbol stream—a symbol stream that is recovered at the receiver to obtain a decoded data stream (only one detected symbol stream is recovered at each stage of a SIC receiver).

The spatial and space-time receiver processing techniques attempt to separate out the transmitted symbol streams at the receiver. Each transmitted symbol stream may be "detected" by (1) combining the various components of the transmitted symbol stream in the $N_R$ received symbol streams based on an estimate of the channel response and (2) removing (or canceling) the interference due to the other transmitted symbol streams. Each receiver processing technique attempts to either (1) decorrelate the individual transmitted symbol streams such that there is no interference from the other transmitted symbol streams or (2) maximize the SNR of each detected symbol stream in the presence of noise and interference from the other symbol streams. Each detected symbol stream is then further processed (e.g., demodulated, deinterleaved, and decoded) to obtain the corresponding data stream.

For simplicity, it is assumed that a linear zero-forcing (ZF) equalizer performs spatial processing by projecting the received symbol streams over an interference-free sub-space to obtain the transmitted symbol streams. The linear ZF equalizer has a response $\underline{W}_{ZF}(k)$, which may be expressed as:

$$\underline{W}_{ZF}(k) = \underline{H}(k)(\underline{H}^H(k)\underline{H}(k))^{-1} \qquad \text{Eq (16)}$$

The detected symbol streams, $\hat{\underline{x}}$, which are estimates of the transmitted symbol streams, $\underline{x}$, may be estimated as:

$$\hat{x}(k) = \underline{W}_{ZF}^H(k)\underline{y}(k) = \underline{x}(k) + \underline{W}_{ZF}^H(k)\underline{n}. \qquad \text{Eq (17)}$$

As shown in the right-hand side of equation (17), the detected symbol streams, $\hat{\underline{x}}$, comprise the transmitted symbol streams, $\underline{x}$, plus filtered noise, $$\underline{W}_{ZF}^H(k)\underline{n},$$

which is in general correlated with a covariance matrix $$\Sigma_n = N_0 \underline{W}_{ZF}^H \underline{W}_{ZF}.$$

The correlation takes place on the same frequency subchannel between the different transmit antennas. This correlation is thus applicable for systems that use all antenna processing (AAP).

The analysis may also be performed based on other linear receivers, as is known by one skilled in the art.

The successive interference cancellation receiver processing technique attempts to recover the transmitted symbol streams, one stream at each stage, using spatial or space-time receiver processing. As each symbol stream is recovered, the interference caused by the recovered symbol stream on the remaining not yet recovered symbol streams is estimated and canceled from the received symbol streams, and the modified symbol streams are similarly processed by the next stage to recover the next transmitted symbol stream.

For a SIC receiver, the l-th stage initially performs spatial or space-time processing on the $N_R$ modified symbol streams to attempt to separate out the $(N_T-l+1)$ transmitted symbol streams that have not yet been recovered. If the SIC receiver uses a linear ZF equalizer, then each transmitted symbol stream may be isolated by filtering the $N_R$ modified symbol streams with a filter matched to that transmitted symbol stream. For simplicity, the following description assumes that the transmitted symbol streams are recovered in an ascending order (i.e., the symbol stream from transmit antenna 1 is recovered first, the symbol stream from transmit antenna 2 is recovered next, and so on, and symbol stream from transmit antenna $N_T$ is recovered last). However, this is not a requirement and the transmitted symbol streams may also be recovered in some other order.

The match filter for the l-th symbol stream to be recovered in the l-th stage has a unit norm vector, $\underline{w}_l(k)$, of $N_R$ filter coefficients for each tone k, where k=0, 1, ... ($N_F$−1). To minimize the interference from the other ($N_T$−1) not-yet-recovered symbol streams on the l-th symbol stream, the vector $\underline{w}_l(k)$ is defined to be orthogonal to $\{\underline{h}_j(k)\}$ for j=l+1, l+2, ... $N_T$. This condition may be expressed as $$\underline{w}_l^H(k)\underline{h}_j(k) = 0,$$

for j=l+1, l+2, ... $N_T$ and also for each k=0, 1, ... ($N_F$−1). Since the transmitted symbol streams from the other (l−1) transmit antennas have already been recovered in prior stages and have been canceled from the modified symbol streams $\underline{y}^l(k)$ for the l-th stage, the vector $\underline{w}_l(k)$ does not need to be orthogonal to $\{\underline{h}_j(k)\}$, for j=1, 2, ... l−1 and k=0, 1, ... ($N_F$−1).

The match filter response $\underline{w}_l(k)$ may be derived based on various spatial or space-time processing techniques. For example, the match filter response $\underline{w}_l(k)$ may be derived using a linear ZF equalizer. For the SIC receiver, the channel response matrix, $\underline{H}(k)$, is reduced by one column in each stage as a transmitted symbol stream is recovered. For the l-th stage, the reduced channel response matrix, $\underline{H}^l(k)$, is an ($N_R \times (N_T-l+1)$) matrix, with (l−1) columns for the transmit antennas of the (l−1) prior-recovered symbol streams removed from the original matrix $\underline{H}(k)$. The ZF equalizer response matrix $$\underline{W}_{ZF}^l(k)$$

for the l-th stage may be derived based on the reduced channel response matrix, $\underline{H}^l(k)$, as shown in equation (16). However, since $\underline{H}^l(k)$ is different for each stage, $$\underline{W}_{ZF}^l(k)$$

is also different for each stage. The match filter response $\underline{w}_l(k)$ for the l-th symbol stream recovered in the l-th stage may be expressed as $$\underline{w}_l(k) = \underline{w}_{ZF}^l(k),$$

where $$\underline{w}_{ZF}^l(k)$$

corresponds to l-th transmit antenna and is the first column of the ZF equalizer response matrix $$\underline{W}_{ZF}^l(k),$$

which is derived for the l-th stage.

The detected symbol stream, $\hat{x}_l$, for the l-th transmit antenna may then be estimated as:

$$\hat{x}_l(k) = \underline{w}_l^H(k)\underline{y}^l(k) = \underline{w}_l^H(k)\underline{h}_l(k)x_l(k) + \underline{w}_l^H(k)\underline{n}. \qquad \text{Eq (18)}$$

The spatial or space-time processing for the l-th stage of the SIC receiver can provide $(N_T-l+1)$ detected symbol streams, $\{\hat{x}_j\}$ for j=l, l+1, ... $N_T$. Each detected symbol stream includes estimates of the modulation symbols transmitted on all $N_F$ frequency subchannels of a respective transmit antenna. The spatial processing thus effectively maps the MIMO system to a number of parallel SISO systems. Of the $(N_T-l+1)$ symbol streams detected at the l-th stage, the one corresponding to the l-th transmit antenna is selected for further processing to obtain the data for that symbol stream.

If the symbol streams can be recovered without error (or with minimal errors) and if the channel response estimate is reasonably accurate, then cancellation of the interference due to the recovered symbol streams is effective. The later recovered symbol streams would then experience less interference and may be able to achieve higher SNRs. In this way, higher performance may be achieved for all recovered symbol streams (possibly except for the first recovered symbol stream). The SIC processing technique can outperform the spatial/space-time receiver processing techniques if the interference due to each recovered stream can be accurately estimated and canceled. This requires error-free or low-error recovery of the transmitted symbol streams, which can be achieved in part by the use of an error-correction code for the symbol stream.

Typically, an important consideration for a SIC receiver is the order in which the transmitted symbol streams are detected. If the same data rate is used for all transmit antennas, then the detected symbol stream that attains the highest SNR may be selected for recovery. However, with the rate control described herein, the rates for the transmit antennas may be selected such that all detected symbol streams are similarly reliable. With rate control, the order in which the symbol streams are detected is not an important consideration.

In an aspect, in a multi-channel system that employs multiple transmission channels for data transmission, each independently processed data stream may be modeled with an equivalent SISO system. Rate control may then be performed for each data stream in similar manner as that described above for the SISO system.

MIMO-OFDM System with AAP

If AAP is used at the transmitter of a MIMO-OFDM system, then for each transmission symbol period the spatial or space-time processing at the receiver provides $N_T$ detected OFDM symbols that have been transmitted from the $N_T$ transmit antennas. Each detected OFDM symbol comprises $N_F$ modulation symbols for the $N_F$ frequency subchannels. The $N_T$ detected OFDM symbols typically fade independently, and each OFDM symbol is distorted by the response of the spatial subchannel via which the OFDM symbol was received.

For the AAP scheme, interleaving is done in both the frequency and space domains. Hence, a codeword may be interleaved across all $N_T$ detected OFDM symbols. A MIMO-OFDM system with AAP (which employs all $N_T N_F$ transmission channels to transmit a codeword) may then be mapped to an equivalent SISO system that employs $N_T N_F$ subcarriers and occupies $N_T$ times the bandwidth of one spatial subchannel (and hence, encountering a channel of $N_T L$ multipaths). If the mapping is effective, then the equivalent SNR for the equivalent SISO system with an AWGN channel may then be used to select the proper data rate for the MIMO-OFDM system with a multipath channel.

Figure 5A:
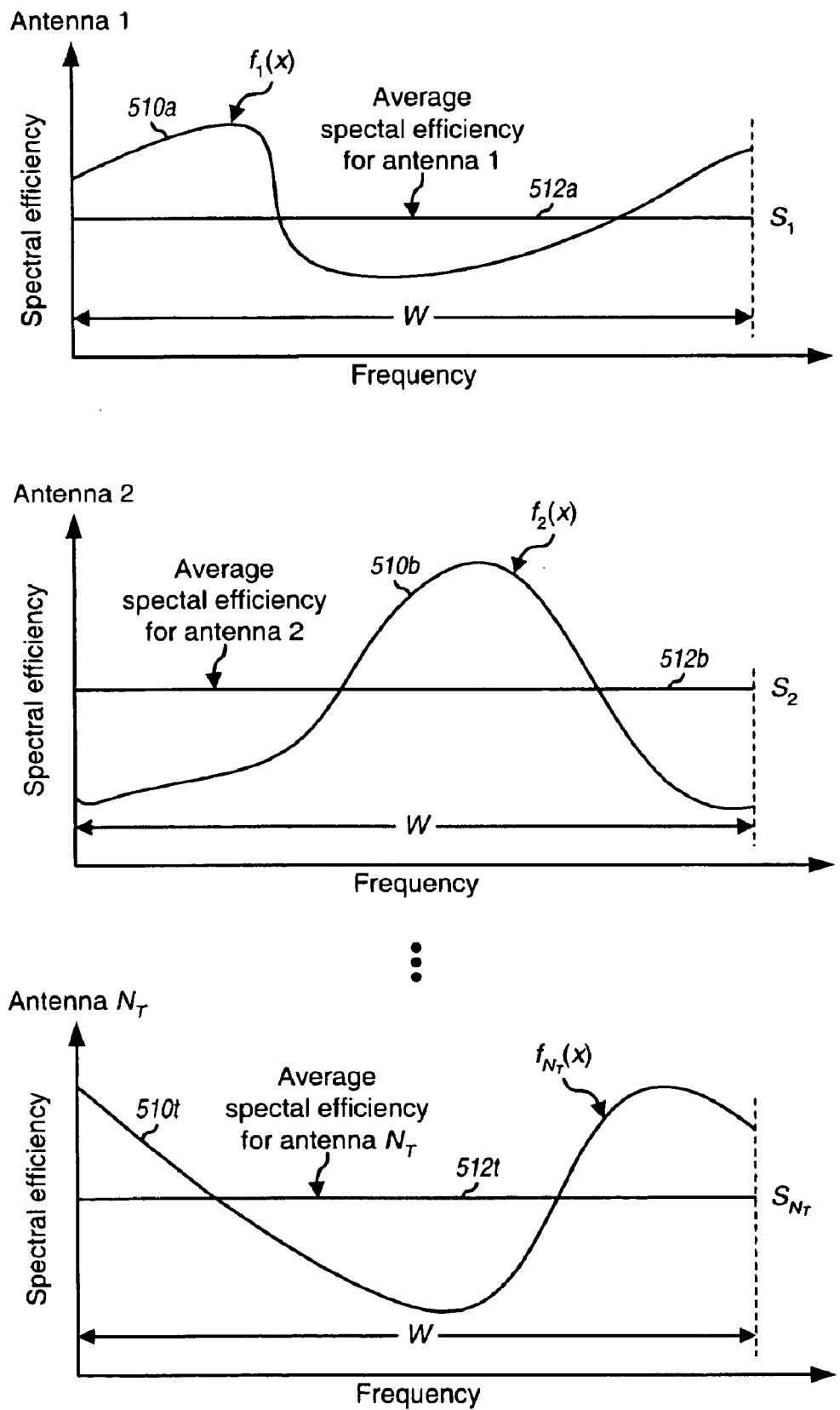
FIG. 5A is a diagram illustrating the spectral efficiencies of the spatial subchannels in a MIMO-OFDM system with a multipath channel.

FIG. 5A is a diagram illustrating the spectral efficiencies of the spatial subchannels in a MIMO-OFDM system with a multipath channel. For the MIMO-OFDM system, there are $N_T$ spatial subchannels if the channel response matrix $\underline{H}(k)$ is full-rank (i.e., $N_S = N_T \leq N_R$). In this case, each spatial subchannel is associated with a respective transmit antenna and has a bandwidth of W. The channel response of each spatial subchannel (or each transmit antenna) is defined by $\underline{h}_j(k)$ for $j=1, 2, \ldots N_T$ and $k=0, 1, \ldots (N_F-1)$, where $\underline{h}_j(k)$ is one column of the matrix $\underline{H}(k)$ and includes $N_R$ elements for the $N_R$ receive antennas.

For each transmit antenna with channel response of $\underline{h}_j(k)$ and noise variance of $N_0$, a plot 510 of the spectral efficiencies for the $N_F$ frequency subchannels may be derived based on the constrained or unconstrained spectral efficiency function as shown in equation (2) or (3). An average spectral efficiency $S_{avg}$ for each transmit antenna may also be derived as shown in equation (5). As shown in FIG. 5A, the spectral efficiency plots 510a through 510t for the $N_T$ transmit antennas (or $N_T$ spatial subchannels) may be different because of independent fading for these spatial subchannels.

Figure 5B:
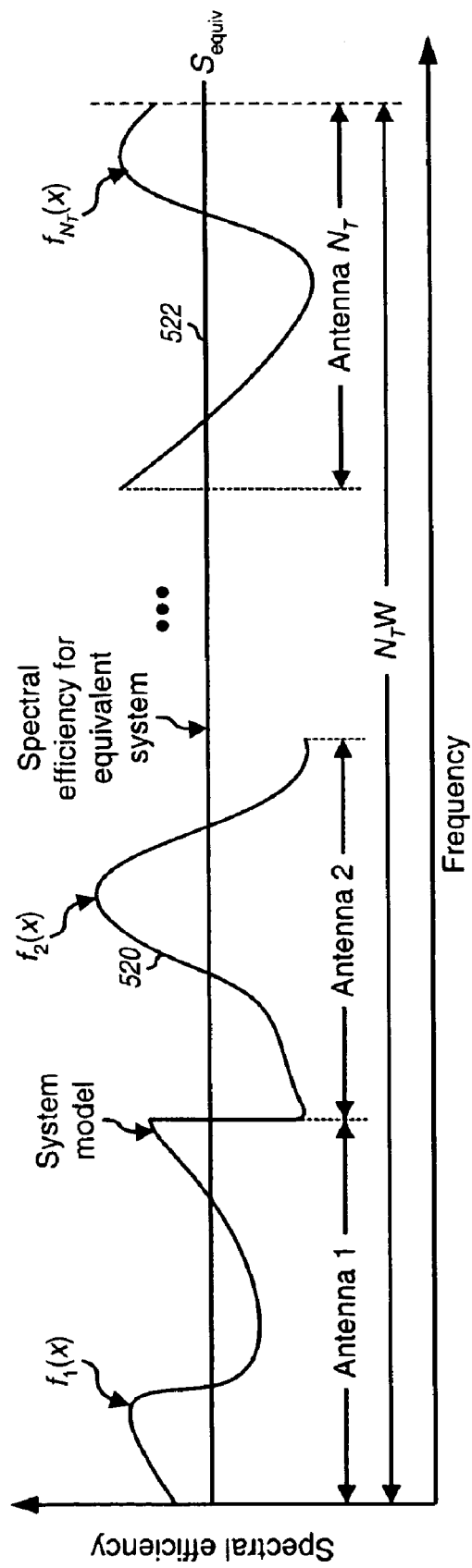
FIG. 5B is a diagram illustrating the spectral efficiency of an equivalent SISO system used to model the MIMO-OFDM system shown in FIG. 5A.

FIG. 5B is a diagram illustrating the spectral efficiency of an equivalent SISO system used to model the MIMO-OFDM system shown in FIG. 5A. The equivalent SISO system is defined to have an AWGN channel and a spectral efficiency equal to the average spectral efficiency of the MIMO-OFDM system being modeled. For the MIMO-OFDM system with $N_T$ parallel colored-noise channels, each occupying a bandwidth of W, the overall capacity $C_{mimo}$ may be expressed as:

$$C_{mimo} = W \log_2 \left( \frac{|\Sigma_s + \Sigma_n|}{|\Sigma_n|} \right), \quad \text{Eq (19)}$$

where $|\Sigma|$ is the determinant of $\Sigma$, and $\Sigma_s$ is a diagonal matrix with the post equalizer signal powers. The diagonal matrix $\Sigma_s$ may be derived based on equation (18) and may be expressed as:

$$\Sigma_s = \begin{bmatrix} |w_1^H h_1|^2 & 0 & \cdots & 0 \\ 0 & |w_2^H h_2|^2 & \cdots & 0 \\ \vdots & \vdots & \ddots & \vdots \\ 0 & 0 & \cdots & |w_{N_T}^H h_{N_T}|^2 \end{bmatrix}. \quad \text{Eq (20)}$$

The capacity $C_{mimo}$ of the MIMO-OFDM system may then be expressed as:

$$C_{mimo} \geq W \sum_{j=1}^{N_T} S_j, \quad \text{Eq (21)}$$

where $S_j$ is the spectral efficiency in bits/s/Hz corresponding to the j-th transmit antenna.

For simplicity, the lower bound in equation (21), i.e., $$C_{mimo} = W \sum_{j=1}^{N_T} S_j,$$

is used for the following description. However, the actual capacity of the MIMO-OFDM system may also be used, and this is within the scope of the invention.

The capacity $C_{siso}$ of the equivalent SISO system occupying a bandwidth of $N_T W$ may be expressed as:

$$C_{siso} = N_T W S_{equiv}, \quad \text{Eq (22)}$$

where $S_{equiv}$ is the spectral efficiency in bits/s/Hz of the equivalent SISO system with AWGN channel.

Setting $C_{siso}$ equal to $C_{mimo}$ and combining equations (22) and (23), the spectral efficiency $S_{equiv}$ of the equivalent SISO system may be expressed as:

$$S_{equiv} = \frac{\sum_{j=1}^{N_T} S_j}{N_T}. \quad \text{Eq (23)}$$

The spectral efficiency $S_j$ for each transmit antenna in the MIMO-OFDM system may be expressed as:

$$S_j = \frac{\sum_{k=0}^{N_F-1} f(\underline{h}_j(k), \underline{w}_j(k), N_0, M(r))}{N_F}, \quad \text{Eq (24)}$$

where $w_j(k)$ is the ZF equalizer response for the j-th transmit antenna, e.g., the j-th column in the matrix $\underline{W}_{ZF}(k)$ determined in equation (16).

The function $f(x)$ in equation (24) is a function of SNR(k) and modulation scheme M(r). The SNR for the k-th frequency subchannel of the j-th transmit antenna may be expressed as:

$$SNR_j(k) = \frac{|\underline{w}_j^H(k)\underline{h}_j(k)|^2}{N_0}. \quad \text{Eq (25)}$$

The average spectral efficiency $S_{avg,\,AAP}$ for the MIMO-OFDM system with AAP may then be expressed as:

$$S_{avg,AAP} = \frac{\sum_{j=1}^{N_T}\sum_{k=0}^{N_F-1} f(\underline{h}_j(k), \underline{w}_j(k), N_0, M(r))}{N_T N_F}. \quad \text{Eq (26)}$$

The average spectral efficiency $S_{avg,\,AAP}$ for the MIMO-OFDM system with AAP is then used as the spectral efficiency $S_{equiv}$ of the equivalent SISO system (i.e., $S_{equiv} = S_{avg,\,AAP}$)

The equivalent SNR for the spectral efficiency $S_{equiv}$ in the equivalent SISO system may then be determined for the MIMO-OFDM system with AAP, as shown in equation (6), which is:

$$\Psi = SNR_{equiv} = g(S_{equiv}, M(r)), \quad \text{Eq (27)}$$

As shown in equation (27), the equivalent SNR is obtained for the equivalent system spectral efficiency $S_{equiv}$, which as shown in equations (24) and (26) is obtained by averaging the spectral efficiencies $S_j$, for j=1, 2, . . . $N_T$, of all $N_T$ transmit antennas. The spectral efficiency $S_j$ of each transmit antenna is in turn obtained by averaging the spectral efficiencies $S_j(k)$ of all $N_F$ frequency subchannels. The equivalent SNR is thus determined by the average spectral efficiency of all frequency subchannels and spatial subchannels, as shown in FIG. 5B. The equivalent SNR may then be used as the metric $\Psi$ to determine the rate for the data transmission over all transmit antennas, in similar manner as that described above for the SISO system.

As shown in FIG. 5B, a discontinuity may exist in the spectral efficiency distribution plot 520 for the equivalent SISO system due to piecewise concatenation of the spectral efficiency functions $f_j(x)$, for j=1, 2, . . . $N_T$, for the $N_T$ transmit antennas. However, this discontinuity effect is mitigated by the role of the interleaver used at the transmitter to interleave data prior to transmission across the frequency and space domains.

MIMO-OFDM System with PAP

If PAP is used at the transmitter of a MIMO-OFDM system, then the rate control may be performed for each of the $N_T$ data streams transmitted from the $N_T$ transmit antennas. At the receiver, either spatial/space-time processing or SIC processing may be used to recover the $N_T$ transmitted symbol streams. Since the SIC processing may provide improved performance over the spatial/space-time processing for PAP, the following description is for a SIC receiver.

For the SIC receiver, to recover the symbol stream from the l-th transmit antenna in the l-th stage, the interference from the (l−1) prior-recovered symbol streams are assumed to be canceled, and the interference from the other ($N_T$−l) not-yet-recovered symbol streams may be minimized (or nulled out) by selecting the proper match filter response $\underline{w}_l(k)$ for the symbol stream to be recovered in this stage. The match filter response $\underline{w}_l(k)$ includes $N_R$ elements for the $N_R$ receive antennas, with each element being a vector of $N_F$ coefficients for the $N_F$ frequency subchannels. Thus, each stage of the SIC receiver resembles a $(1, N_R)$ SIMO system.

The average spectral efficiency $S_{avg,\,PAP,l}$ for each transmit antenna in the MIMO-OFDM system with PAP may be expressed as:

$$S_{avg,PAP,l} = \frac{\sum_{k=0}^{N_F-1} f(\underline{h}_l(k), \underline{w}_l(k), N_0, M(r))}{N_F}, \quad \text{Eq (28)}$$

where $\underline{h}_l(k)$ and $\underline{w}_l(k)$ are respectively the channel response and the filter response associated with the l-th transmit antenna. The average spectral efficiency $S_{avg,\,PAP,l}$ for each transmit antenna in the MIMO-OFDM system with PAP is used as the spectral efficiency $S_{equiv}$ of the equivalent SISO system (i.e., $S_{equiv}=S_{avg,\,PAP,l}$) to determine the rate for the transmit antenna.

The function $f(x)$ in equation (28) is a function of SNR and modulation scheme M(r). The SNR for the k-th frequency subchannel of the l-th transmit antenna may be expressed as:

$$SNR_l(k) = \frac{|\underline{w}_l^H(k)\underline{h}_l(k)|^2}{N_0}. \quad \text{Eq (29)}$$

As noted above, the match filter response $\underline{w}_l(k)$ for the symbol stream recovered in the l-th stage is a column of the ZF equalizer response matrix $$\underline{W}_{ZF}^l(k).$$

The matrix $$\underline{W}_{ZF}^l(k)$$

is derived for the l-th stage based on the reduced channel response matrix, $\underline{H}^l(k)$, which has (l−1) columns for the (l−1) prior-recovered symbol streams removed.

For each transmit antenna in the MIMO-OFDM system with PAP, the spectral efficiency $S_{equiv}$ of the equivalent SISO system may be determined as shown in equation (28), and the equivalent SNR may then be determined for the spectral efficiency $S_{equiv}$ as shown in equation (27). The equivalent SNR for each transmit antenna is determined by the average spectral efficiency of all frequency subchannels of the transmit antenna, as shown in FIG. 5A. The equivalent SNR for each transmit antenna may then be used as the metric $\Psi$ to determine the rate for that transmit antenna, in similar manner as that described above for the SISO system.

Multi-channel System with MCP

For a multi-channel processing (MCP) scheme, one or more data streams are independently processed (e.g., encoded, interleaved, and modulated) at the transmitter to provide one or more corresponding symbol streams, and each symbol stream may then be transmitted over a respective group of transmission channels. Each transmission channel group may include (1) some or all frequency subchannels of a spatial subchannel, (2) some or all frequency subchannels of multiple spatial subchannels, (3) some or all spatial subchannels of a frequency subchannel, (4) some or all spatial subchannels of multiple frequency subchannels, (5) any combination of transmission channels, or (6) all transmission channels. The rate for each independently processed data stream may be controlled such that improved performance (e.g., high throughput) is achieved. The AAP and PAP may be viewed as variants of the MCP scheme.

Figure 6:
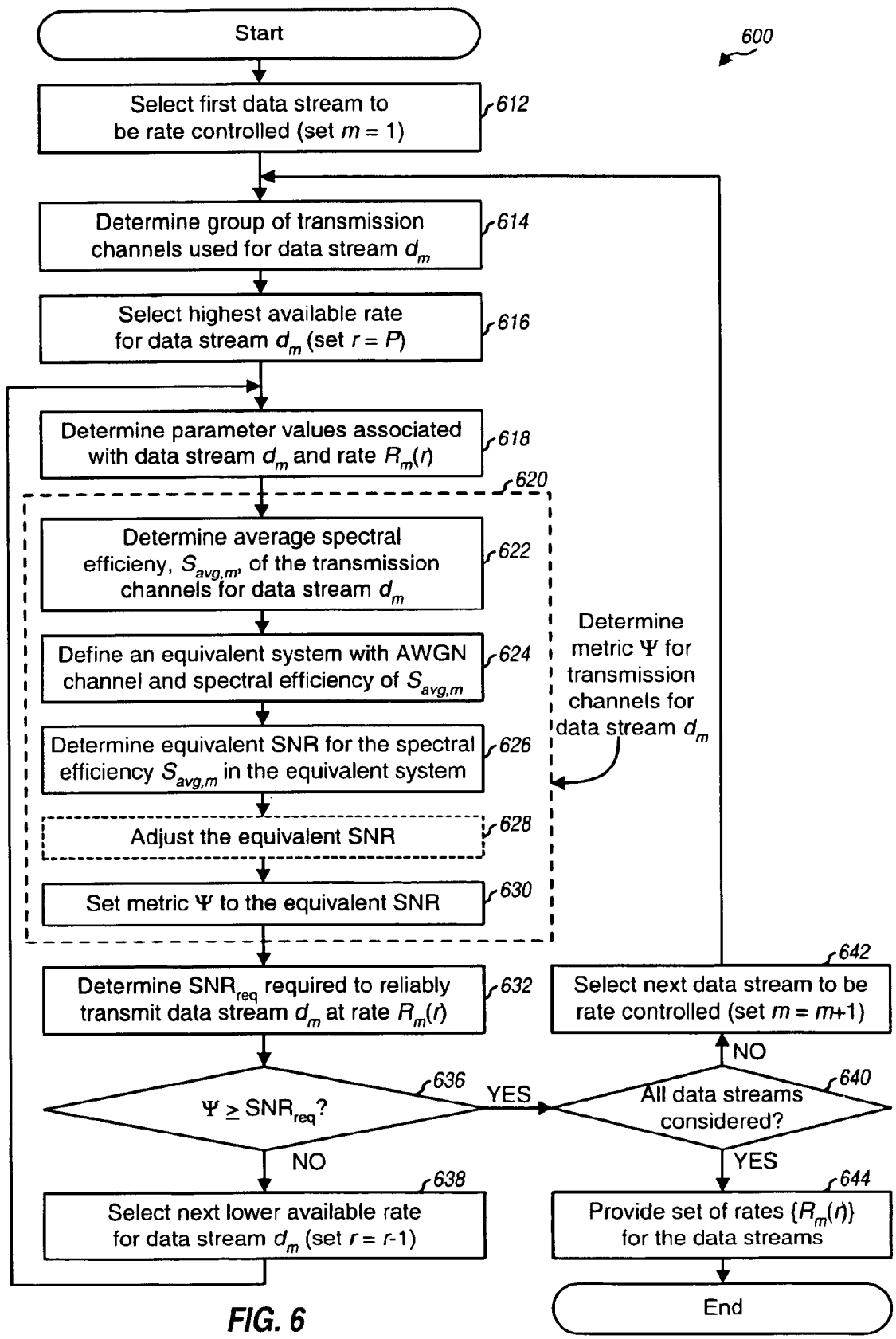
FIG. 6 is a flow diagram of an embodiment of a process for controlling the rate of one or more independently processed data streams in a multi-channel system.

FIG. 6 is a flow diagram of an embodiment of a process 600 for controlling the rate of one or more independently processed data streams, each of which is transmitted over a respective group of transmission channels.

Initially, the first data stream to be rate controlled is selected, for example, by setting a variable m used to denote the data stream to one (i.e., m=1) (step 612). The group of transmission channels used for data stream $d_m$ is then determined (step 614). For the AAP scheme, one data stream is transmitted over all frequency subchannels of all spatial subchannels, and the transmission channel group would then include all transmission channels. For the PAP scheme, one data stream is transmitted over all frequency subchannels of each spatial subchannel, and the transmission channel group would then include all frequency subchannels for the transmit antenna used for data stream $d_m$. For the MCP scheme, the transmission channel group may include any combination of frequency and spatial subchannels.

The highest available rate $R_m(r)$ that may be used for data stream $d_m$ is then selected for evaluation (step 616). If the available rates are included in a set in increasing order, then the highest available rate may be selected by setting a variable r to P (i.e., r=P), which is the highest index for the set. The same rate set may be used for all data streams, or each data stream may be associated with a different rate set.

Parameters associated with data stream $d_m$ and rate $R_m(r)$ are then determined (step 618). Some parameters may relate to the processing for data stream $d_m$, such as the modulation scheme $M_m(r)$ to be used for the data stream. Some other parameters may relate to the communication channel, such as the channel response $h_{i,j}(k)$ for each transmission channel in the group and the noise variance $N_0$.

A metric $\Psi$ is then determined for data stream $d_m$ (block 620). In an embodiment, the metric $\Psi$ relates to the SNR for an equivalent SISO system that models the group of transmission channels used for data stream $d_m$. The metric $\Psi$ may be obtained by first determining the average spectral efficiency $S_{avg, MCP,m}$ of all transmission channels used for data stream $d_m$ (step 622), which may be expressed as:

$$S_{avg, MCP, m} = \frac{\sum_{n=0}^{N_m} f(h_n, w_n, N_0, M_m(r))}{N_m}, \quad \text{Eq (30)}$$

where $h_n$ and $w_n$ are respectively the channel response and filter response associated with the n-th transmission channel, where n is an index comprising (i,j,k), $M_m(r)$ is the modulation scheme used for data stream $d_m$, and $N_m$ is the number of transmission channels used for data stream $d_m$. For data stream $d_m$, the same modulation scheme may be used for all transmission channels, as shown in equation (30), or different modulation schemes may be used for different transmission channels.

The spectral efficiency of the equivalent SISO system is then set equal to the average spectral efficiency of the transmission channels used for data stream $d_m$ (i.e., $S_{equiv,m} = S_{avg, MCP,m}$) (step 624). The equivalent SNR needed to support a rate of $S_{equiv,m}$ in the equivalent SISO system is then determined based on equation (27) (step 626). The equivalent SNR may be adjusted by a back-off amount to account for implementation losses, as described above for the SISO system (step 628). This step is optional and represented by a dashed box for step 628. The metric $\Psi$ is then set equal to the unadjusted or adjusted equivalent SNR (step 630). The SNR required to reliably transmit data stream $d_m$ at rate $R_m(r)$ for the multi-channel system with an AWGN channel is then determined, e.g., from a table (step 632).

A determination is then made whether or not rate $R_m(r)$ is supported by the group of transmission channels used for data stream $d_m$ (step 636). If the metric $\Psi$ is greater than or equal to the required SNR (i.e., $\Psi \geq SNR_{req}$), then rate $R_m(r)$ is deemed to be supported for data stream $d_m$, and the process proceeds to step 640. Otherwise, the next lower available rate is selected for data stream $d_m$ by decrementing the index r (i.e., r=r−1) (step 638). The process then returns to step 618 to evaluate the new rate.

At step 640, a determination is made whether or not rate control has been performed for all data streams. If the answer is no, then rate control is performed for the next data stream by incrementing the variable m (i.e., m=m+1) (step 642). The process then returns to step 614 to determine the rate for the new data stream $d_m$. Otherwise, if rate control has been performed for all data streams, then the set of rates $\{R_m(r)\}$, for m=1, 2, ..., $N_D$, to be used for the $N_D$ independently processed data streams is provided (step 644). The process then terminates.

It can be shown via computer simulation that the rate control techniques described herein can approach the performance of an optimal rate selection scheme. The optimal selection scheme is a non-practical scheme that tests every available rate (for a given channel realization) and selects the highest rate whose PER conforms to the desired PER of $P_e$. The rate control techniques described herein may thus be used to implement a realizable rate control scheme having high performance.

Figure 7:
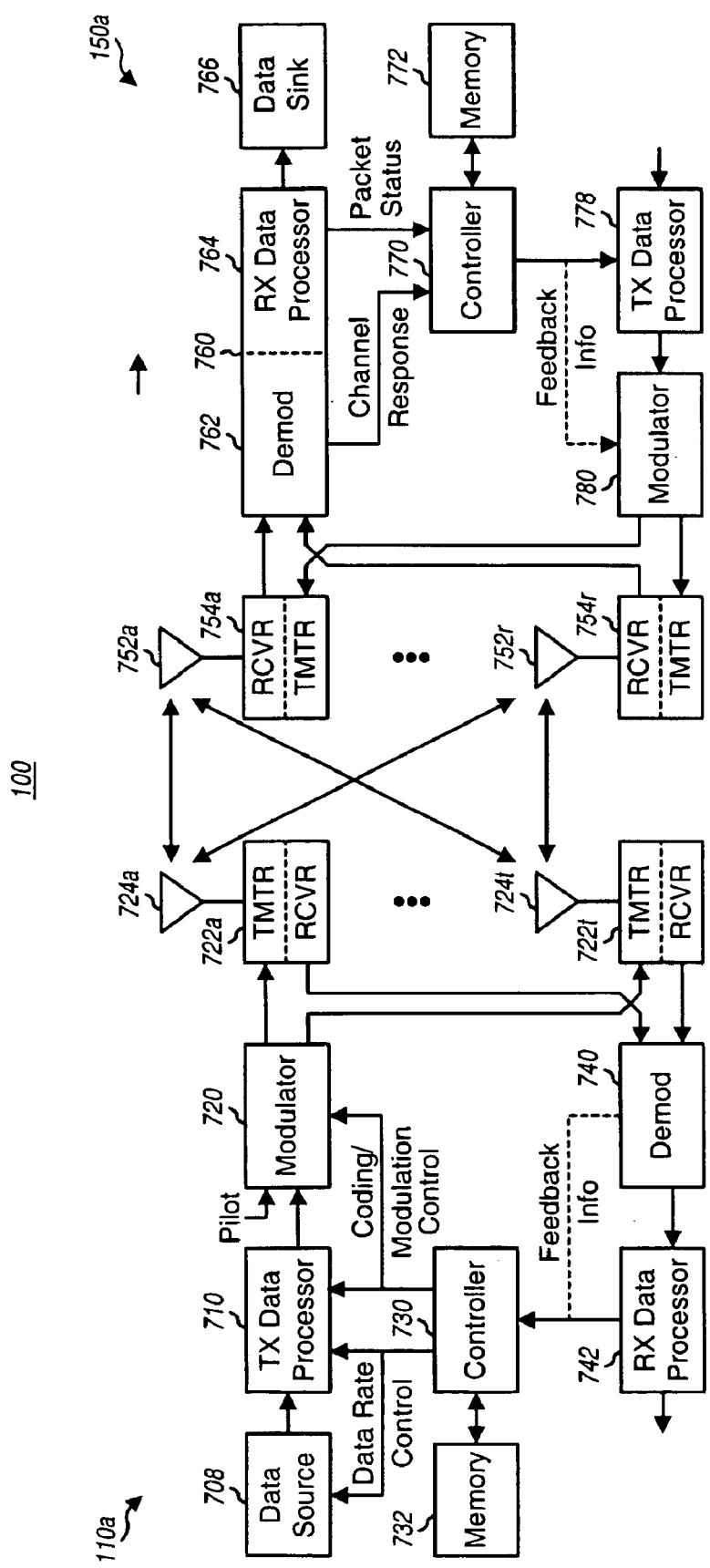
FIG. 7 is a block diagram of an embodiment of a transmitter system and a receiver system in the multi-channel system.

FIG. 7 is a block diagram of an embodiment of a transmitter system 110a and a receiver system 150a in multi-channel communication system 100.

At transmitter system 110a, traffic data is provided from a data source 708 to a TX data processor 710. TX data processor 710 may demultiplex the data into a number of data streams, and further formats, codes, and interleaves each data stream based on a coding scheme to provide a corresponding coded data stream. The data rate and the coding for each data stream may be determined by a data rate control and a coding control, respectively, provided by a controller 730.

The coded data is then provided to a modulator 720, which may also receive pilot data (e.g., data used for channel estimation and other functions). The pilot data may be multiplexed with the coded traffic data, e.g., using time division multiplex (TDM) or code division multiplex (CDM), in all or a subset of the transmission channels used to transmit the traffic data. For OFDM, the processing by modulator 720 may include (1) modulating the received data with one or more modulation schemes, (2) transforming the modulated data to form OFDM symbols, and (3) appending a cyclic prefix to each OFDM symbol to form a corresponding transmission symbol. The modulation is performed based on a modulation control provided by controller 730. A transmission symbol stream is then provided to each transmitter (TMTR) 722.

Each transmitter 722 converts the received transmission symbol stream into one or more analog signals and further conditions (e.g., amplifies, filters, and upconverts) the analog signals to generate a modulated signal suitable for transmission over the communication channel. The modulated signal from each transmitter 722 is then transmitted via an associated antenna 724 to the receiver system.

At receiver system 150a, the transmitted modulated signals are received by each of antennas 752a through 752r, and the received signal from each antenna is provided to an associated receiver (RCVR) 754. Each receiver 754 conditions (e.g., filters, amplifies, and downconverts) its received signal and digitizes the conditioned signal to provide data samples. The sample streams from receivers 754a through 754r are then provided to a receiver processor 760, which includes a demodulator 762 and an RX data processor 764.

For OFDM, the processing by demodulator 762 may include (1) removing the cyclic prefix previously appended to each OFDM symbol, (2) transforming each recovered OFDM symbol, and (3) demodulating the recovered modulation symbols in accordance with one or more demodulation schemes complementary to the one or more modulation schemes used at the transmitter system. RX data processor 764 then decodes the demodulated data to recover the transmitted traffic data. The processing by demodulator 762 and RX data processor 764 is complementary to that performed by modulator 720 and TX data processor 710, respectively, at transmitter system 110a.

As shown in FIG. 7, demodulator 762 may derive estimates of the channel characteristics (e.g., the channel response and noise variance) and provide these channel estimates to a controller 770. RX data processor 764 may also derive and provide the status of each received packet and may further provide one or more other performance metrics indicative of the decoded results. Based on the various types of information received from demodulator 762 and RX data processor 764, controller 770 may determine or select a particular rate for each independently processed data stream based on the techniques described above. Feedback information in the form of a set of selected rates for the data streams, the channel response estimates, ACK/NACK for the receive packet, and so on, or any combination thereof, may be provided by controller 770, processed by a TX data processor 778, modulated by a modulator 780, and conditioned by transmitters 754, and transmitted by antennas 752 back to transmitter system 110a.

At transmitter system 110a, the modulated signals from receiver system 150a are received by antennas 724, conditioned by receivers 722, demodulated by a demodulator 740, and processed by a RX data processor 742 to recover the feedback information transmitted by the receiver system. The feedback information is then provided to controller 730 and used to control the processing of the data streams. For example, the data rate of each data stream may be determined based on the selected rate provided by the receiver system, or may be determined based on the channel estimates from the receiver system. The specific coding and modulation schemes associated with the selected rate are determined and reflected in the coding and modulation controls provided to TX data processor 710 and modulator 720. The received ACK/NACK may be used to initiate an incremental transmission whereby a small portion of a packet received in error is retransmitted to allow the receiver to correctly recover the packet.

Controllers 730 and 770 direct the operation at the transmitter and receiver systems, respectively. Memories 732 and 772 provide storage for program codes and data used by controllers 730 and 770, respectively.

Figure 8:
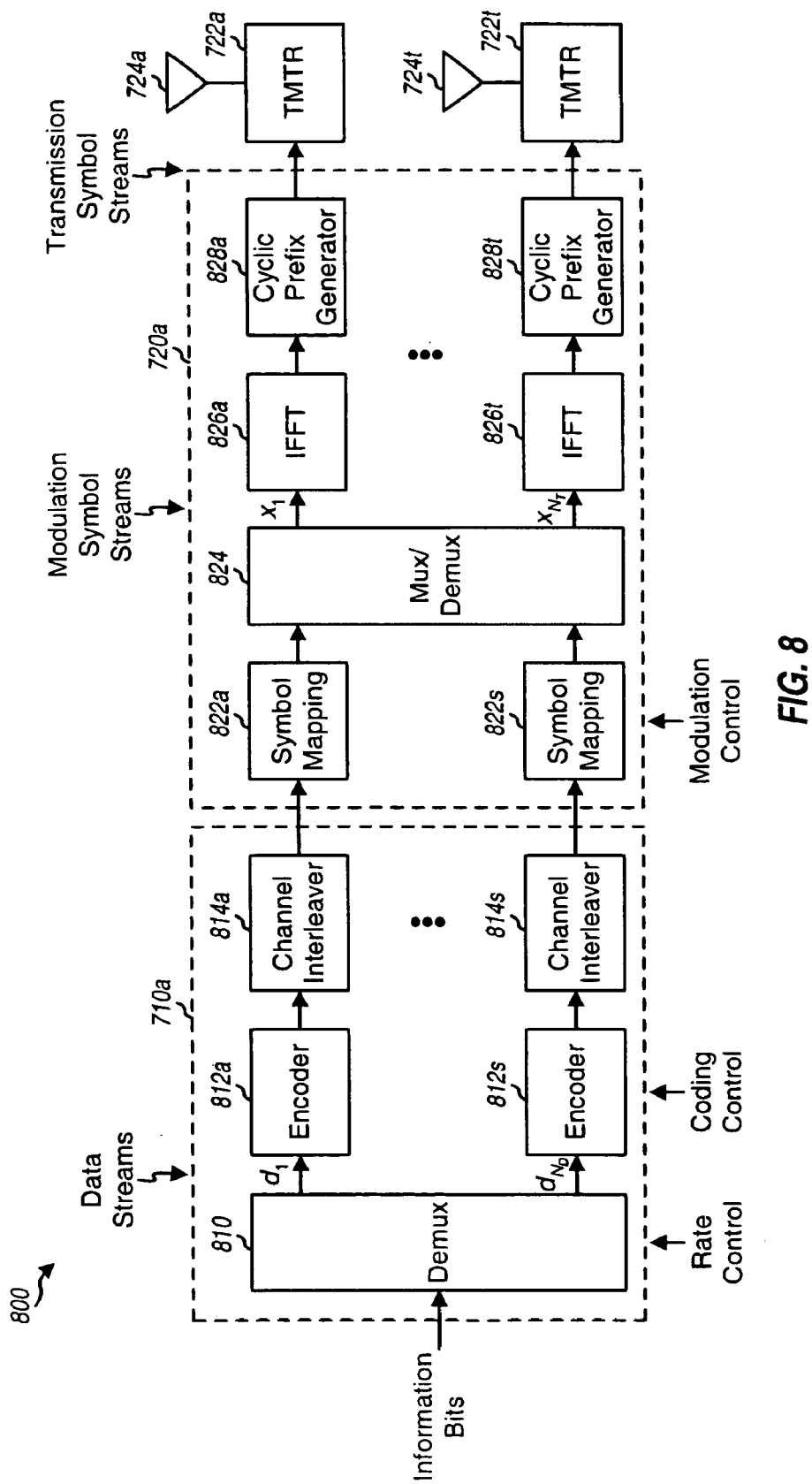
FIG. 8 is a block diagram of a transmitter unit in the transmitter system.

FIG. 8 is a block diagram of a transmitter unit 800, which is an embodiment of the transmitter portion of transmitter system 110a in FIG. 7. Transmitter unit 800 includes (1) a TX data processor 710a that codes each data stream in accordance with a particular coding scheme to provide a corresponding coded data stream and (2) a modulator 720a that modulates and performs OFDM processing on the coded data streams to provide transmission symbol streams.

In an embodiment, each data stream may be associated with it own data rate and coding and modulation schemes, which are identified by the controls provided by controller 730. The rate selection for each data stream may be performed as described above.

In the embodiment shown in FIG. 8, TX data processor 710a includes a demultiplexer 810, $N_D$ encoders 812a through 812s, and $N_D$ channel interleavers 814a through 814s (i.e., one set of encoder and channel interleaver for each data stream). Demultiplexer 810 demultiplexes the traffic data (i.e., the information bits) into $N_D$ data streams, where $N_D$ an be any integer one or greater. The $N_D$ data streams are provided at data rates determined to be supported by the $N_D$ groups of transmission channels used for these data streams. Each data stream is provided to a respective encoder 812.

Each encoder 812 codes a respective data stream based on the specific coding scheme selected for that data stream to provide coded bits. The coding increases the reliability of the data transmission. The coding scheme may include any combination of cyclic redundancy check (CRC) coding, convolutional coding, Turbo coding, block coding, and so on. The coded bits from each encoder 812 are then provided to a respective channel interleaver 814, which interleaves the coded bits based on a particular interleaving scheme. The interleaving provides time diversity for the coded bits, permits the data to be transmitted based on an average SNR for the transmission channels used for the data stream, combats fading, and further removes correlation between coded bits used to form each modulation symbol. The $N_D$ coded data streams are then provided to modulator 720a.

In the embodiment shown in FIG. 8, modulator 720a includes $N_D$ symbol mapping elements 822a through 822s (one for each data stream), a multiplexer/demultiplexer 824, and $N_T$ OFDM modulators (one for each transmit antenna), with each OFDM modulator including an inverse Fourier transform (IFFT) unit 826 and a cyclic prefix generator 828.

Each symbol mapping element 822 receives a respective coded data stream and maps the coded and interleaved bits based on the modulation scheme selected for that data stream to form modulation symbols. Each symbol mapping element 822 groups each set of $q_m$ coded and interleaved bits to form a non-binary symbol, and further maps the non-binary symbol to a specific point in a signal constellation corresponding to the selected modulation scheme (e.g., QPSK, M-PSK, or M-QAM). Each mapped signal point corresponds to an $M_m$-ary modulation symbol, where $M_m$ corresponds to the specific modulation scheme selected for data stream $d_m$ and $M_m = 2^{q_m}$. Pilot data may also be symbol mapped to provide pilot symbols, which may then be multiplexed (e.g., using TDM or CDM) with the modulation symbols for the traffic data. Symbol mapping elements 822a through 822s then provide the modulation symbols for the $N_D$ data streams to multiplexer/demultiplexer 824.

Each data stream is transmitted on a respective group of transmission channels, and each transmission channel group may include any number and combination of spatial and frequency subchannels. Multiplexer/demultiplexer 824 provides the modulation symbols for each data stream to the transmission channels to be used for that data stream. Multiplexer/demultiplexer 824 then provides $N_T$ modulation symbol streams to the $N_T$ OFDM modulators.

For the AAP scheme, one data stream is transmitted over all transmission channels, and only one set of encoder 812, channel interleaver 814, and symbol mapping element 822 is needed. Multiplexer/demultiplexer 824 then demultiplexes the modulation symbols into $N_T$ modulation symbol streams for the $N_T$ transmit antennas.

For the PAP scheme, one data stream is transmitted over all frequency subchannels of each transmit antenna, and $N_T$ sets of encoder 812, channel interleaver 814, and symbol mapping element 822 are provided (i.e., $N_D=N_S$). Multiplexer/demultiplexer 824 then simply passes the modulation symbols from each symbol mapping element 822 to an associated IFFT 826.

For the MCP scheme, each data stream is transmitted over a respective group of transmission channels. Multiplexer/demultiplexer 824 performs the appropriate multiplexing/demultiplexing of the modulation symbols to the proper transmission channels.

Within each OFDM modulator, IFFT 826 receives the modulation symbol stream, groups each set of $N_F$ modulation symbols to form a corresponding modulation symbol vector, and converts this vector into its time-domain representation (which is referred to as an OFDM symbol) using the inverse fast Fourier transform. For each OFDM symbol, cyclic prefix generator 828 repeats a portion of the OFDM symbol to form a corresponding transmission symbol. The cyclic prefix ensures that the transmission symbol retains its orthogonal properties in the presence of multipath delay spread, thereby improving performance against deleterious path effects such as channel dispersion caused by frequency selective fading. Cyclic prefix generator 828 then provides a stream of transmission symbols to an associated transmitter 722.

Each transmitter 722 receives and processes a respective transmission symbol stream to generate a modulated signal, which is then transmitted from the associated antenna 724.

The coding and modulation for MIMO systems with and without OFDM are described in further detail in the following U.S. patent applications:

U.S. patent application Ser. No. 09/993,087, entitled "Multiple-Access Multiple-Input Multiple-Output (MIMO) Communication System," filed Nov. 6, 2001;

U.S. patent application Ser. No. 09/854,235, entitled "Method and Apparatus for Processing Data in a Multiple-Input Multiple-Output (MIMO) Communication System Utilizing Channel State Information," filed May 11, 2001;

U.S. patent application Ser. Nos. 09/826,481 and 09/956,449, both entitled "Method and Apparatus for Utilizing Channel State Information in a Wireless Communication System," respectively filed Mar. 23, 2001 and Sep. 18, 2001;

U.S. patent application Ser. No. 09/776,075, entitled "Coding Scheme for a Wireless Communication System," filed Feb. 1, 2001; and U.S. patent application Ser. No. 09/532,492, entitled "High Efficiency, High Performance Communications System Employing Multi-Carrier Modulation," filed Mar. 30, 2000.

These applications are all assigned to the assignee of the present application and incorporated herein by reference. Other designs for the transmitter unit may also be implemented and are within the scope of the invention.

Figure 9:
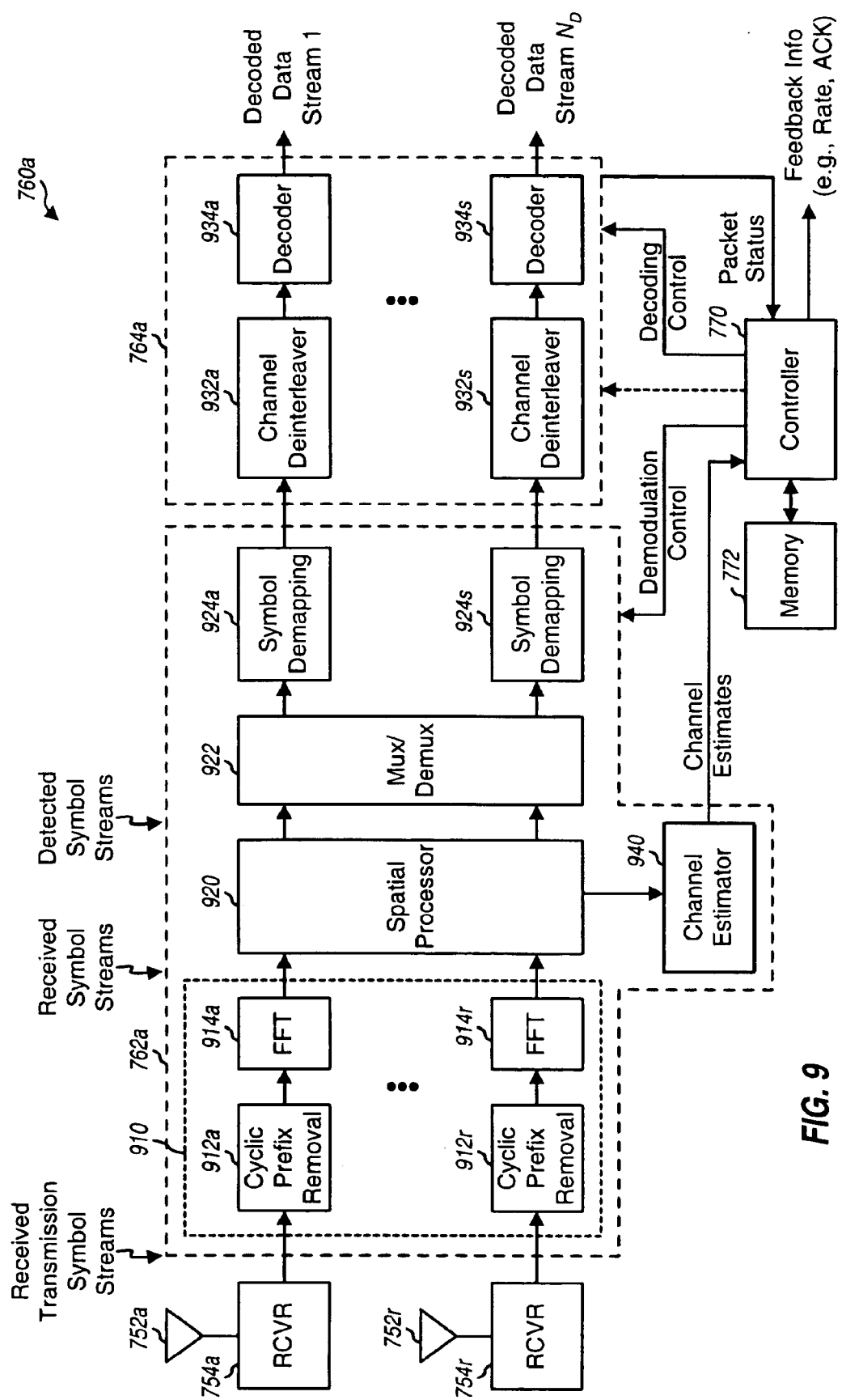
FIGS. 9 and 10 are block diagrams of two embodiments of a receiver processor in the receiver system.

FIG. 9 is a block diagram of an embodiment of a receiver processor 760a, which is one embodiment of receiver processor 760 in FIG. 7. The transmitted modulated signals are received by antennas 752 and processed by receivers 754 to provide $N_R$ sample streams, which are then provided to an RX OFDM processor 910 within demodulator 762a.

Within demodulator 762a, each sample stream is provided to a respective OFDM demodulator, which includes a cyclic prefix removal element 912 and an FFT unit 914. Element 912 removes the cyclic prefix included in each transmission symbol to provide a corresponding recovered OFDM symbol. FFT 914 then transforms each recovered OFDM symbol using the fast Fourier transform to provide a vector of $N_F$ recovered modulation symbols for the $N_F$ frequency subchannels for each transmission symbol period. FFT units 914a through 914r provide $N_R$ received symbol streams to a spatial processor 920.

Spatial processor 920 performs spatial or space-time processing on the $N_R$ received symbol streams to provide $N_T$ detected symbol streams, which are estimates of the $N_T$ transmitted symbol streams. Spatial processor 920 may implement a linear ZF equalizer, a channel correlation matrix inversion (CCMI) equalizer, a minimum mean square error (MMSE) equalizer, an MMSE linear equalizer (MMSE-LE), a decision feedback equalizer (DFE), or some other equalizer, which are described in detail in the aforementioned U.S. patent application Ser. Nos. 09/993,087, 09/854,235, 09/826,481, and 09/956,44.

A multiplexer/demultiplexer 922 then multiplexes/demultiplexes the detected symbols, and provides $N_D$ aggregated detected symbol streams for the $N_D$ data streams to $N_D$ symbol demapping elements 924. Each symbol demapping element 924 then demodulates the detected symbols in accordance with a demodulation scheme that is complementary to the modulation scheme used for the data stream. The $N_D$ demodulated data streams from $N_D$ symbol demapping elements 924 are then provided to a RX data processor 764a.

Within RX data processor 764a, each demodulated data stream is de-interleaved by a channel de-interleaver 932 in a manner complementary to that performed at the transmitter system for the data stream, and the de-interleaved data is further decoded by a decoder 934 in a manner complementary to that performed at the transmitter system. For example, a Turbo decoder or a Viterbi decoder may be used for decoder 934 if Turbo or convolutional coding, respectively, is performed at the transmitter unit. The decoded data stream from each decoder 934 represents an estimate of the transmitted data stream. Decoder 934 may also provide the status of each received packet (e.g., indicating whether it was received correctly or in error). Decoder 934 may further store demodulated data for packets not decoded correctly, so that this data may be combined with data from a subsequent incremental transmission and decoded.

In the embodiment shown in FIG. 9, a channel estimator 940 estimates the channel response and the noise variance and provides these estimates to controller 770. The channel response and noise variance may be estimated based on the detected symbols for the pilot.

Controller 770 may be designed to perform various functions related to rate selection. For example, controller 770 may determine the maximum data rate that may be used for each data stream based on the channel estimates and other parameters such as the modulation scheme.

FIG. 10 is a block diagram of an embodiment of a receiver processor 760b, which is another embodiment of receiver processor 760 in FIG. 7. Receiver processor 760b performs SIC processing and may be used if the PAP or MCP scheme is employed at the transmitter system. For simplicity, the following description for receiver processor 760b assumes that the PAP scheme is employed.

In the embodiment shown in FIG. 10, receiver processor 760b includes (1) RX OFDM processor 910 that processes the $N_R$ sample streams to provide $N_R$ received symbol streams, as described above, and (2) a spatial/data processor 1000. Spatial/data processor 1000 includes a number of successive (i.e., cascaded) receiver processing stages 1010a through 1010t, one stage for each of the symbol streams to be recovered. Each receiver processing stage 1010 (except for the last stage 1010t) includes a spatial processor 1020, an RX data processor 1030, and an interference canceller 1040. The last stage 1010t includes only spatial processor 1020t and RX data processor 1030t.

For the first stage 1010a, spatial processor 1020a receives and processes the $N_R$ received symbol streams (denoted as a vector $\underline{y}^1$) from RX OFDM processor 910 based on a particular spatial or space-time equalizer (e.g., a linear ZF equalizer, a CCMI equalizer, an MMSE equalizer, a MMSE-LE, or a DFE) to provide $N_T$ detected symbol streams (denoted as a vector $\hat{\underline{x}}^1$). One data stream is selected for recovery, and spatial processor 1020a provides the detected symbol stream $\hat{x}_1$ for this data stream to RX data processor 1030a. Processor 1030a further processes (e.g., demodulates, deinterleaves, and decodes) the selected detected symbol stream $\hat{x}_1$ to provide a corresponding decoded data stream. Spatial processor 1020a may further provide an estimate of the channel response, which is used to perform the spatial or space-time processing for all stages.

For the first stage 1010a, interference canceller 1040a receives the $N_R$ received symbol streams from receivers 154 (i.e., the vector $\underline{y}^1$). Interference canceller 1040a also receives and processes (e.g., encodes, interleaves, and symbol maps) the decoded data stream from RX data processor 1030a to provide a remodulated symbol stream, $\check{x}_1$, which is an estimate of the symbol stream just recovered. The remodulated symbol stream $\check{x}_1$ is further processed in the time or frequency domain to derive estimates of the interference components (denoted as an interference vector $\underline{i}^1$) due to the just-recovered symbol stream. For the time-domain implementation, the remodulated symbol stream $\check{x}_1$ is OFDM processed to obtain a transmission symbol stream, which is further convolved by each of $N_R$ elements in a channel impulse response vector $\underline{h}_1$ to derive $N_R$ interference components due to the just-recovered symbol stream. The vector $\underline{h}_1$ is a column of the channel impulse response matrix, $\underline{H}$, corresponding to transmit antenna 1 used for the just-recovered symbol stream. The vector $\underline{h}_1$ includes $N_R$ elements that define the channel impulse response between transmit antenna 1 and the $N_R$ receive antennas. For the frequency-domain implementation, the remodulated symbol stream $\check{x}_1$ is multiplied by each of $N_R$ elements in a channel frequency response vector $\underline{h}_1$ (which is a column of the matrix $\underline{H}$) to derive $N_R$ interference components. The interference components $\underline{i}^1$ are then subtracted from the first stage's input symbol streams $\underline{y}^1$ to derive $N_R$ modified symbol streams (denoted as a vector $\underline{y}^2$), which include all but the subtracted (i.e., cancelled) interference components. The $N_R$ modified symbol streams are then provided to the next stage.

For each of the second through last stages 1010b through 1010t, the spatial processor for that stage receives and processes the $N_R$ modified symbol streams from the interference canceller in the preceding stage to derive the detected symbol streams for that stage. For each stage, one detected symbol stream is selected and processed by the RX data processor to provide the corresponding decoded data stream. For each of the second through second-to-last stages, the interference canceller in that stage receives the $N_R$ modified symbol streams from the interference canceller in the preceding stage and the decoded data stream from the RX data processor within the same stage, derives the $N_R$ interference components due to the symbol stream recovered by that stage, and provides $N_R$ modified symbol streams for the next stage.

The successive interference cancellation receiver processing technique is described in further detail in the aforementioned U.S. patent application Ser. Nos. 09/993,087 and 09/854,235.

FIGS. 7 and 9 show a simple design whereby the receiver sends back the rates for the data streams. Other designs may also be implemented and are within the scope of the invention. For example, the channel estimates may be sent to the transmitter (instead of the rates), which may then determine the rates for the data streams based on these channel estimates.

The rate control techniques described herein may be implemented using various designs. For example, channel estimator 940 in FIG. 9 used to derive and provide the channel estimates may be implemented by various elements in the receiver system. Some or all of the processing to determine the rate may be performed by controller 770 (e.g., with one or more look-up tables stored in memory 772). Other designs for performing the rate control may also be contemplated and are within the scope of the invention.

The rate control techniques described herein may be implemented by various means. For example, these techniques may be implemented in hardware, software, or a combination thereof. For a hardware implementation, some of the elements used to implement the rate control may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, some portions of the rate control may be implemented with modules (e.g., procedures, functions, and so on) that perform the functions described herein. The software codes may be stored in a memory unit (e.g., memory 732 or 772 in FIG. 7) and executed by a processor (e.g., controller 730 or 770). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a multi-channel communication system, a method for determining a rate for a data transmission over a wireless communication channel, comprising:
identifying a plurality of transmission channels to be used for the data transmission;
defining an equivalent system for the transmission channels based on one or more estimated channel characteristics of the transmission channels;
deriving a metric for the transmission channels based on the equivalent system; and
determining a particular rate for the data transmission based on the metric.

2. The method of claim 1, further comprising:
determining an average spectral efficiency of the transmission channels based on the one or more estimated channel characteristics, and
wherein the equivalent system is defined to have an additive white Gaussian noise (AWGN) channel and a spectral efficiency equal to the average spectral efficiency of the transmission channels.

3. The method of claim 2, further comprising:
estimating a spectral efficiency of each transmission channel based on the one or more estimated channel characteristics, and
wherein the average spectral efficiency of the transmission channels is determined based on the estimated spectral efficiencies of the transmission channels.

4. The method of claim 3, wherein the spectral efficiency of each transmission channel is estimated based on a constrained spectral efficiency function.

5. The method of claim 4, wherein the spectral efficiency of each transmission channel is further estimated based on a modulation scheme to be used for the data transmission.

6. The method of claim 3, wherein the spectral efficiency of each transmission channel is estimated based on an unconstrained spectral efficiency function.

7. The method of claim 2, wherein the deriving the metric includes
determining an equivalent signal-to-noise-and-interference ratio (SNR) for the equivalent system, and
wherein the metric is related to the equivalent SNR.

8. The method of claim 7, wherein the equivalent SNR is determined based on an inverse function of a spectral efficiency function used to estimate a spectral efficiency of each transmission channel.

9. The method of claim 7, wherein the deriving the metric further includes
adjusting the equivalent SNR to account for losses in the communication system, and wherein the metric is related to the adjusted equivalent SNR.

10. The method of claim 1, further comprising:
determining a particular modulation scheme to use for the data transmission, and wherein the equivalent system is further defined based on the modulation scheme.

11. The method of claim 1; further comprising:
determining an SNR required to support the particular data rate by the communication system, and wherein the particular data rate is determined to be supported by the transmission channels if the required SNR is less than or equal to the metric.

12. The method of claim 1, wherein the one or more estimated channel characteristics comprise an SNR for each transmission channel.

13. The method of claim 1, wherein the one or more estimated channel characteristics comprise an estimated frequency response and an estimated noise variance for the transmission channels.

14. The method of claim 1, wherein the transmission channels are frequency subchannels or spatial subchannels, or both, in a multipath wireless communication channel with frequency selective fading.

15. The method of claim 1, wherein the multi-channel communication system is a multiple-input multiple-output (MIMO) communication system and the transmission channels correspond to spatial subchannels.

16. The method of claim 1, wherein the multi-channel communication system is an orthogonal frequency division multiplex (OFDM) communication system and the transmission channels correspond to frequency subchannels.

17. The method of claim 1, wherein the multi-channel communication system is a multiple-input multiple-output (MIMO) communication system that employs orthogonal frequency division multiplex (OFDM), and the transmission channels correspond to frequency subchannels of spatial subchannels.

18. The method of claim 1, wherein a set of rates is available for the data transmission, the method further comprising:
evaluating each of one or more available rates to determine a highest rate supported by the transmission channels.

19. In a multi-channel communication system, a method for determining a rate for a data transmission over a wireless communication channel, comprising:
identifying a group of transmission channels to be used for the data transmission;
obtaining an estimated signal-to-noise-and-interference ratio (SNR) of each transmission channel;
estimating spectral efficiency of each transmission channel based on the estimated SNR for the transmission channel;
determining an average spectral efficiency of the transmission channels based on estimated spectral efficiencies of the transmission channels;
determining an equivalent SNR for an equivalent system with a spectral efficiency equal to the average spectral efficiency of the transmission channels;
determining a required SNR to support a particular data rate by the communication system; and
determining whether the particular rate is supported by the transmission channels for the data transmission based on the equivalent SNR and the required SNR.

20. The method of claim 19, wherein the spectral efficiency of each transmission channel is estimated based on an unconstrained spectral efficiency function.

21. The method of claim 19, wherein the spectral efficiency of each transmission channel is further estimated based on a modulation scheme to be used for the data transmission.

22. The method of claim 19, wherein the multi-channel communication system is a MIMO communication system that employs OFDM.

23. In a multi-channel communication system, a method for determining a set of rates for a set of data streams to be transmitted over a wireless communication channel, comprising:
identifying a group of transmission channels to be used for each data stream;
defining an equivalent system for each transmission channel group based on one or more estimated channel characteristics of the transmission channels in the group;

deriving a metric for each transmission channel group based on the associated equivalent system; and determining a rate for each data stream based on the metric associated with the data stream.

24. The method of claim 23, further comprising:

estimating a spectral efficiency of each transmission channel based on the one or more estimated channel characteristics, and determining an average spectral efficiency of the transmission channels in each group based on estimated spectral efficiencies of the transmission channels, and wherein the equivalent system for each transmission channel group is defined to have an additive white Gaussian noise (AWGN) channel and a spectral efficiency equal to the average spectral efficiency of the transmission channels in the group.

25. The method of claim 24, wherein the spectral efficiency of each transmission channel is estimated based on an unconstrained or constrained spectral efficiency function.

26. The method of claim 23, further comprising:

for each data stream, determining an SNR required to support a particular rate by the communication system, and wherein the particular rate is determined to be supported by the group of transmission channels for the data stream if the required SNR is less than or equal to the metric associated with the data stream.

27. The method of claim 23, wherein the multi-channel communication system is a MIMO communication system that employs OFDM, and the transmission channels correspond to frequency subchannels of spatial subchannels.

28. The method of claim 27, wherein each data stream is transmitted over a respective transmit antenna, and each transmission channel group includes all frequency subchannels for one transmit antenna.

29. A memory communicatively coupled to a digital signal processing device (DSPD) capable of interpreting digital information to:

identify a plurality of transmission channels to be used for the data transmission;

define an equivalent system for the transmission channels based on one or more estimated channel characteristics of the transmission channels;

derive a metric for the transmission channels based on the equivalent system; and determine a particular rate for the data transmission based on the metric.

30. The memory of claim 29, wherein the DSPD is further capable of interpreting digital information to:

estimate a spectral efficiency of each transmission channel based on the one or more estimated channel characteristics, and determine an average spectral efficiency of the transmission channels based on estimated spectral efficiencies of the transmission channels, and wherein the equivalent system is defined to have an additive white Gaussian noise (AWGN) channel and a spectral efficiency equal to the average spectral efficiency of the transmission channels.

31. A receiver unit in a multi-channel communication system, comprising:

a channel estimator operative to derive estimates of one or more characteristics of a plurality of transmission channels; and a rate selector operative to define an equivalent system based on the one or more estimated channel characteristics of the transmission channels, derive a metric for the transmission channels based on the equivalent system, and determine a particular rate for the data transmission based on the metric.

32. The receiver unit of claim 31, wherein the rate selector is further operative to estimate a spectral efficiency of each transmission channel based on the one or more estimated channel characteristics, and determine an average spectral efficiency of the transmission channels based on estimated spectral efficiencies of the transmission channels, and wherein the equivalent system is defined to have an additive white Gaussian noise (AWGN) channel and a spectral efficiency equal to the average spectral efficiency of the transmission channels.

33. The receiver unit of claim 32, wherein the spectral efficiency of each transmission channel is estimated based on a constrained or unconstrained channel spectral efficiency function.

34. The receiver unit of claim 32, further comprising:

a memory configured to store one or more tables for a function used to estimate the spectral efficiency of each transmission channel.

35. The receiver unit of claim 31, further comprising:

a controller operative to provide feedback information comprised of the particular rate.

36. An apparatus in a multi-channel communication system, comprising:

means for identifying a plurality of transmission channels to be used for the data transmission;

means for defining an equivalent system based on one or more estimated channel characteristics of the transmission channels;

means for deriving a metric for the transmission channels based on the equivalent system; and means for determining a particular rate for the data transmission based on the metric.

37. The receiver apparatus of claim 36, further comprising:

means for estimating a spectral efficiency of each transmission channel based on the one or more estimated channel characteristics, and means for determining an average spectral efficiency of the transmission channels based on estimated spectral efficiencies of the transmission channels, and wherein the equivalent system is defined to have an additive white Gaussian noise (AWGN) channel and a spectral efficiency equal to the average spectral efficiency of the transmission channels.

38. The receiver apparatus of claim 37, further comprising:

means for storing one or more tables for a function used to estimate the spectral efficiency of each transmission.

39. A transmitter unit in a multi-channel communication system, comprising:

a controller operative to identify a rate to use for a data transmission over a plurality of transmission channels in a wireless communication channel, wherein the rate is determined based on an equivalent system defined for the transmission channels based on one or more estimated channel characteristics of the transmission channels;

a transmit data processor operative to code data, provided at the identified rate, in accordance with a particular coding scheme to provide coded data; and a modulator operative to modulate the coded data in accordance with a particular modulation scheme to provide modulated data.

40. The transmitter unit of claim 39, further comprising:

a transmitter operative to generate at least one modulated signal for the modulated data.

41. The transmitter unit of claim 39, wherein the multi-channel communication system is a MIMO communication system that employs OFDM, and the transmission channels correspond to frequency subchannels of spatial subchannels.

42. An apparatus in a wireless communication system, comprising:

means for identifying a rate to use for a data transmission over a plurality of transmission channels in a wireless communication channel, wherein the rate is determined based on an equivalent system defined for the transmission channels based on one or more estimated channel characteristics of the transmission channels;

means for coding data, provided at the identified rate, in accordance with a particular coding scheme to provide coded data; and means for modulating the coded data in accordance with a particular modulation scheme to provide modulated data.

43. A transmitter unit in a multi-channel communication system, comprising:

a controller operative to identify a set of rates for a set of data streams to be transmitted over a wireless communication channel, wherein the rate for each data stream is determined based on an equivalent system defined for a group of transmission channels used for the data stream, and wherein the equivalent system for each transmission channel group is defined based on one or more estimated channel characteristics of the transmission channels in the group;

at least one transmit data processor operative to code each data stream, provided at the identified rate, in accordance with a coding scheme selected for the data stream to provide a corresponding coded data stream; and at least one modulator operative to modulate each coded data steam in accordance with a modulation scheme selected for the data stream to provide a corresponding modulation stream.

44. A multi-channel communication system comprising:

a receiver unit including a channel estimator operative to derive estimates of one or more characteristics of a plurality of transmission channels, and a rate selector operative to define an equivalent system based on the one or more estimated channel characteristics of the transmission channels, derive a metric for the transmission channels based on the equivalent system, and determine a particular rate for the data transmission based on the metric; and a transmitter unit including at least one transmit data processor operative to code data, provided at the determined rate, in accordance with a coding scheme to provide coded data, and at least one modulator operative to modulate the coded data in accordance with a modulation scheme to provide modulated data.

* * * * *